US012405991B2

(12) United States Patent
Harrison et al.

(10) Patent No.: US 12,405,991 B2
(45) Date of Patent: Sep. 2, 2025

(54) AUTOMATED TOOL FOR DETERMINING AND PROVIDING INFORMATION ABOUT DWELLINGS WITHIN GEOGRAPHICAL REGIONS THAT ARE DETERMINED SPECIFIC TO INDICATED LOCATIONS

(71) Applicant: MFTB Holdco, Inc., Seattle, WA (US)

(72) Inventors: Zachary Preston Harrison, Jackson, WY (US); Jack Gibbons, San Diego, CA (US); Aveek Karmakar, Issaquah, WA (US); Nitish Jain, Fremont, CA (US); Saeid Balaneshinkordan, Sammamish, WA (US); Gowri Kumaraguruapran, Mountain House, CA (US)

(73) Assignee: MFTB Holdco, Inc., Seattle, WA (US)

( * ) Notice: Subject to any disclaimer, the term of this patent is extended or adjusted under 35 U.S.C. 154(b) by 0 days.

(21) Appl. No.: 18/622,829

(22) Filed: Mar. 29, 2024

(65) Prior Publication Data
US 2025/0245262 A1 Jul. 31, 2025

Related U.S. Application Data

(60) Provisional application No. 63/625,199, filed on Jan. 25, 2024.

(51) Int. Cl.
*G06F 16/30* (2019.01)
*G06F 16/29* (2019.01)
(Continued)

(52) U.S. Cl.
CPC ........... *G06F 16/387* (2019.01); *G06F 16/29* (2019.01); *G06Q 50/16* (2013.01)

(58) Field of Classification Search
CPC ........ G06F 16/387; G06F 16/29; G06Q 50/16
See application file for complete search history.

(56) References Cited

U.S. PATENT DOCUMENTS

2010/0076968 A1* 3/2010 Boyns ................... H04W 4/185
715/825
2013/0151425 A1* 6/2013 Feinstein ................ G06F 40/20
704/9
(Continued)

FOREIGN PATENT DOCUMENTS

WO WO-2018220387 A1 * 12/2018 ........... G06F 16/243

OTHER PUBLICATIONS

Article entitled "A Natural Language Query Interface for Tourism Information", by Dittenbach et al., dated 2003 (Year: 2003).*
(Continued)

*Primary Examiner* — Mahesh H Dwivedi
(74) *Attorney, Agent, or Firm* — VLP Law Group LLP; James A. D. White

(57) ABSTRACT

Techniques are described for performing automated operations related to determining and providing information about dwellings within geographical regions specific to indicated locations, such as within an indeterminate distance from an indicated point-of-interest (POI) location by determining and using individualized geographical search regions specific to each POI location. In some situations, for each of a plurality of POI locations, a geographical region specific to that POI location is predetermined in an individualized manner for that POI location using attribute(s) of that POI location, to represent a geographical region for that POI location considered to be nearby that POI location, and then using such predefined POI-specific nearby geographical regions when responding to a later received search query that specifies multiple search criteria using a sequence of multiple free-form natural language terms that indicate such a POI location, such as in combination with other search criteria.

24 Claims, 12 Drawing Sheets

(51) Int. Cl.
*G06F 16/387* (2019.01)
*G06Q 50/16* (2012.01)

(56) References Cited

U.S. PATENT DOCUMENTS

| | | | | |
|---|---|---|---|---|
| 2014/0280292 | A1 | 9/2014 | Skinder | |
| 2015/0278860 | A1* | 10/2015 | Rayanchu | G06F 16/248 705/14.54 |
| 2018/0181591 | A1* | 6/2018 | Bryant | G06Q 50/16 |
| 2018/0253780 | A1* | 9/2018 | Wang | H04L 51/02 |
| 2018/0329926 | A1* | 11/2018 | Cordesses | G06Q 10/02 |
| 2021/0142430 | A1* | 5/2021 | Xu | G06Q 50/16 |

OTHER PUBLICATIONS

Archive of https://findsider.com, by Findsider, dated Dec. 19, 2014 (Year: 2014).*
Article entitled "Redfin Launches ChatGPT Plugin to Help People Find Their Next Home", by Ptaszynski, dated May 3, 2023 (Year: 2023).*
Article entitled "ChatGPT in Real Estate: Enhancing Property Search and Customer Queries", by Dasha, dated Sep. 28, 2023 (Year: 2023).*
"Zillow's new AI-powered natural-language search is a first in real estate", Jan. 26, 2023, retrieved on Nov. 22, 2023 from https://investors.zillowgroup.com/investors/news-and-events/news/news-details/2023/Zillows-new-AI-powered-natural-language-search-is-a-first-in-real-estate/default.aspx, 2 pages.
"Zillow builds ChatGPT plugin for real estate searches", May 2, 2023, retrieved on Dec. 18, 2023 from https://investors.zillowgroup.com/investors/news-and-events/news/news-details/2023/Zillow-builds-ChatGPT-plugin-for-real-estate-searches/default.aspx, 2 pages.
Homesnapblog, "New: Draw Your Own Search Area To Look For Homes", May 24, 2018, retrieved on Nov. 22, 2023 from https://blog.homesnap.com/homesnap-draw-your-own-search-area-homes/, 8 pages.
"Zillow home-search tools that can help you search multiple locations—or draw your own search map", Feb. 26, 2013, retrieved on Nov. 22, 2023 from https://www.zillowgroup.com/news/new-draw-your-own-search-on-zillow-com/, 4 pages.
Brian Carmody, "The 7 Best Real Estate Websites of 2024", Dec. 13, 2023, retrieved on Jan. 5, 2024 from https://www.investopedia.com/best-real-estate-websites-5069964, 19 pages.
Google Search Page for "homes near north lake" search, retrieved on Jan. 13, 2024 from https://www.google.com/search?q=homes+near+north+lake, 1 page.
Redfin Search Page for "north lake" search, retrieved on Jan. 13, 2024 from https://redfin.com, 1 page.
Redfin Search Page for "homes near north lake" search, retrieved on Jan. 13, 2024 from https://redfin.com, 1 page.
Redfin Search Page for "lake sammammish wa" search, retrieved on Jan. 13, 2024 from https://redfin.com, 1 page.
Redfin Search Page for "washington elementary school" search, retrieved on Jan. 13, 2024 from https://redfin.com, 1 page.
Matt G. Southern, "Google Maps Makes It Easier To Find Restaurants And Bars", Jun. 27, 2018, retrieved on Jan. 5, 2024 from https://www.searchenginejournal.com/google-maps-makes-it-easier-to-find-restaurants-and-bars/258949/, 3 pages.
"How Google Uses Location Information—Privacy & Terms", retrieved on Jan. 13, 2024 from https://policies.google.com/technologies/location-data, 13 pages.
Erwin van Holten, "How To Find Restaurants Other Than My Location", Mar. 6, 2023, retrieved on Jan. 5, 2024 from https://support.google.com/maps/thread/204943052/how-to-find-restaurants-other-than-my-location?hl=en, 5 pages.
"Searching For Homes—Redfin Customer Service", retrieved on Jan. 11, 2024 from https://support.redfin.com/hc/en-us/articles/360001432632-Searching-for-Homes, 11 pages.
Sarah Lentz, "Zillow And Redfin Announce ChatGPT Plugins To Change The Way People Search For Homes", May 4, 2023, retrieved on Jan. 13, 2024 from https://nowbam.com/zillow-and-redfin-announce-chatgpt-plugins-to-change-the-way-people-search-for-homes/, 5 pages.

* cited by examiner

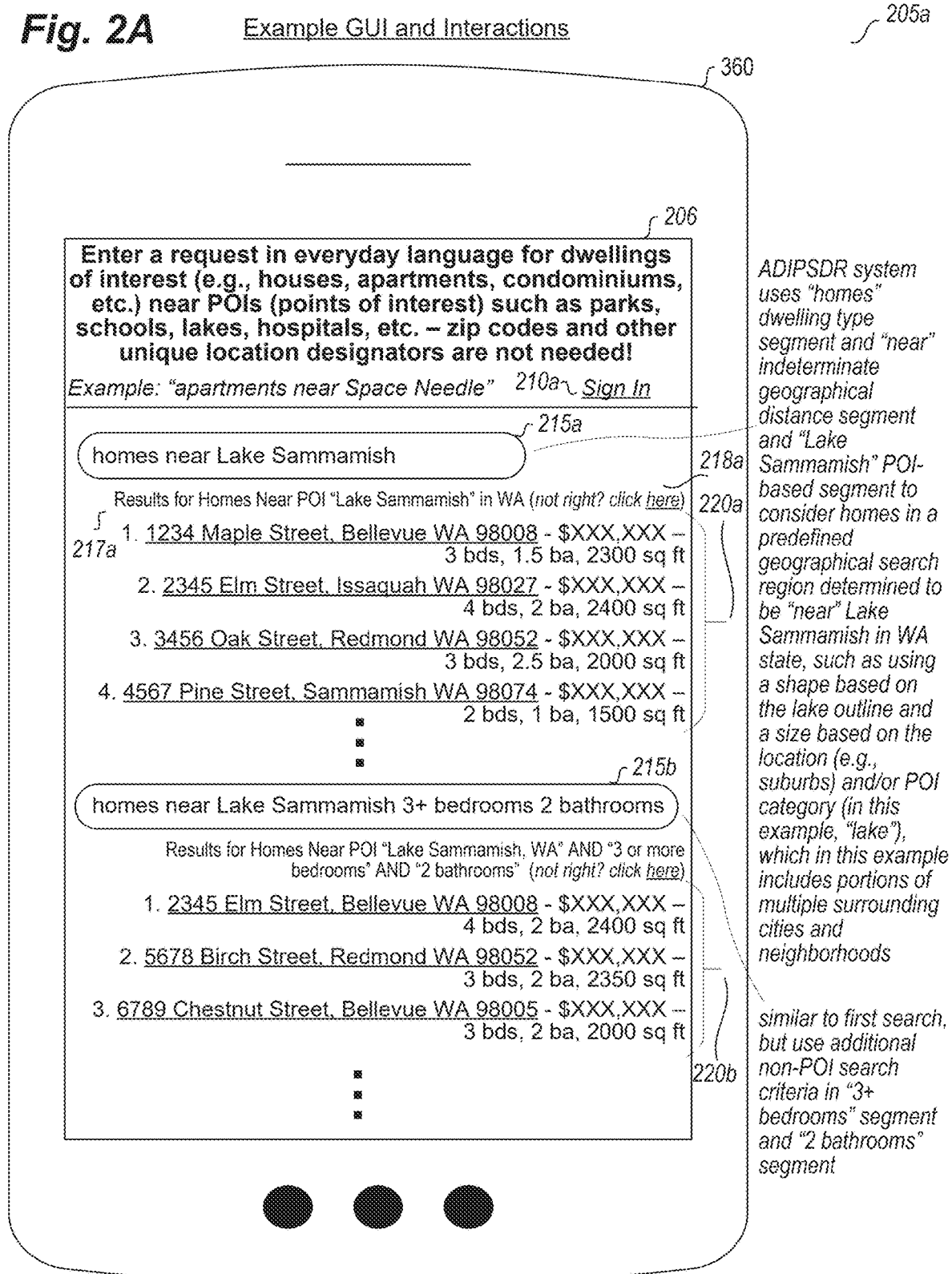
Fig. 2A  Example GUI and Interactions

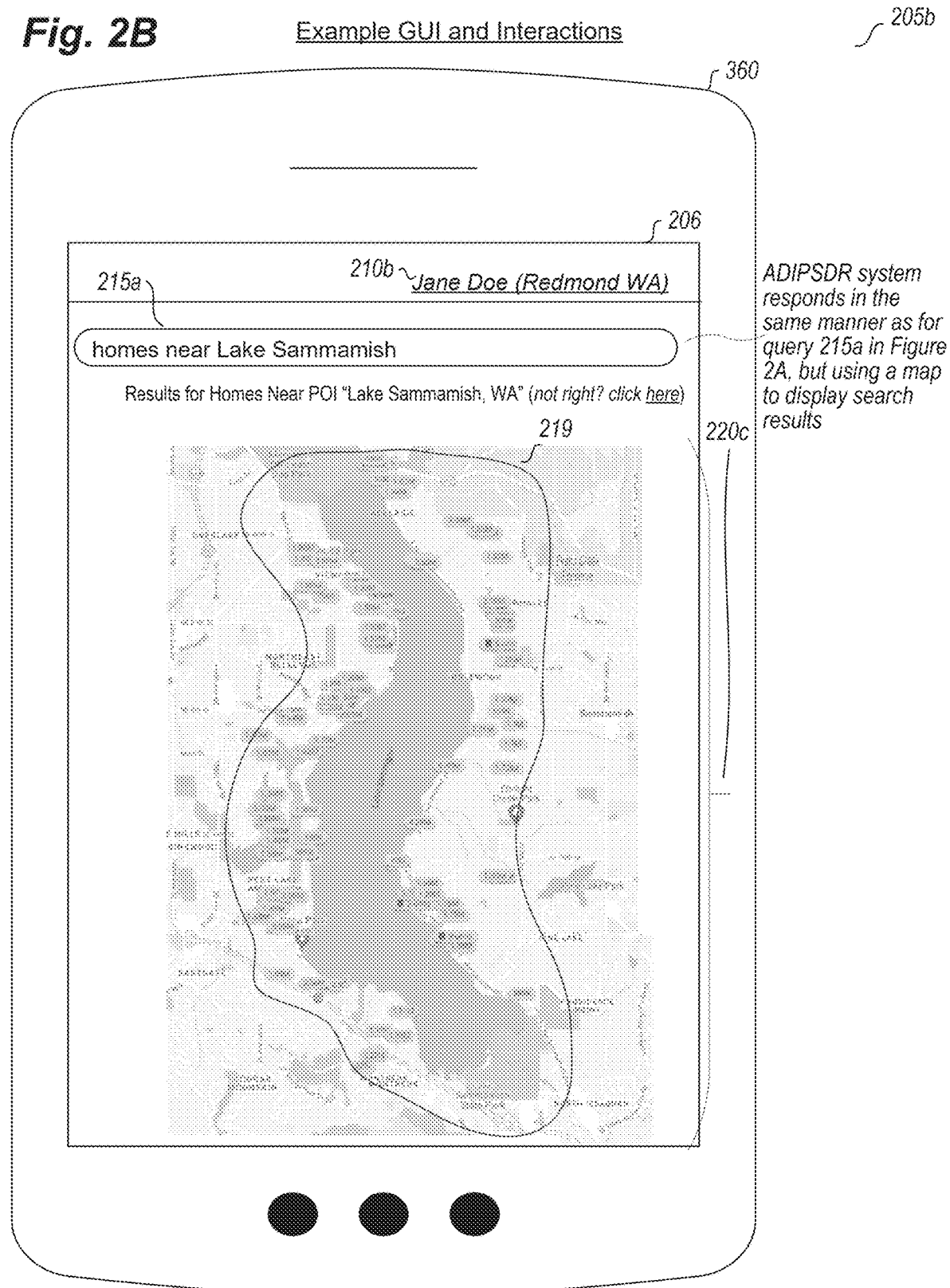
Fig. 2B — Example GUI and Interactions

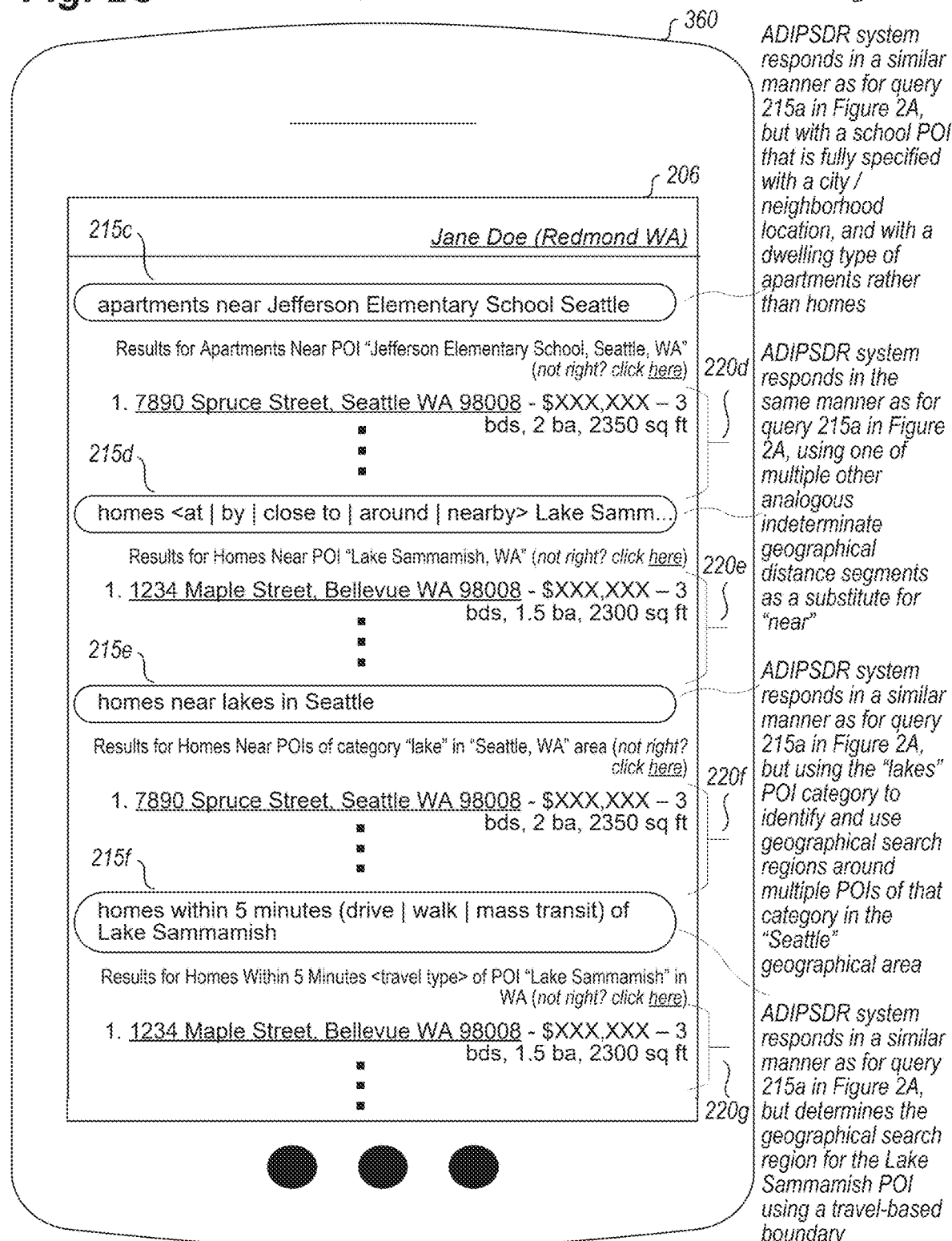

Fig. 2D     Example GUI and Interactions     205d

206

215g     Jane Doe (Redmond WA)

( homes within 5 minutes (drive | walk | mass transit) of lakes in Seattle )

Results for Homes Within 5 Minutes <travel type> of POIs of category "lake" in "Seattle, WA" area (not right? click here)   220h 1. 7890 Spruce Street, Seattle WA 98008 - $XXX,XXX -- 3 bds, 2 ba, 2350 sq ft 215h ( homes near Lake Sammamish or Lake Washington )

Results for Homes Near POI "Lake Sammamish" in WA OR POI "Lake Washington" in WA (not right? click here)   220i 1. 1234 Maple Street, Bellevue WA 98008 - $XXX,XXX -- 3 bds, 1.5 ba, 2300 sq ft 215i ( homes near Lake Sammamish and walking distance to highly rated restaurants )

Results for Homes Near POI "Lake Sammamish" in WA AND Within 10 Minutes Walking of POIs of category "restaurant" with attribute "highly rated" in "Redmond, WA" area (not right? click here)   220j 3. 3456 Oak Street, Redmond WA 98052 - $XXX,XXX -- 3 bds, 2.5 ba, 2000 sq ft

*ADIPSDR system responds in a similar manner as for query 215f in Figure 2C, but with the travel-based search boundary determined for each POI in the POI category*

*ADIPSDR system responds in a similar manner as for query 215a in Figure 2A, but with two alternative POIs specified, using a corresponding geographical search region for each*

*ADIPSDR system responds in a similar manner as for query 215a in Figure 2A, but with the geographical search region for the Lake Sammamish POI combined with a travel-based walking search boundary using a default walking time and determined for each POI in the POI category for a default area based on user's location*

AUTOMATED TOOL FOR DETERMINING AND PROVIDING INFORMATION ABOUT DWELLINGS WITHIN GEOGRAPHICAL REGIONS THAT ARE DETERMINED SPECIFIC TO INDICATED LOCATIONS

CROSS REFERENCE TO RELATED APPLICATIONS

This application claims the benefit of U.S. Provisional Patent Application No. 63/625,199, filed Jan. 25, 2024 and entitled "Automated Tool For Determining And Providing Information About Dwellings Within Geographical Regions That Are Determined Specific To Indicated Locations," which is hereby incorporated by reference in its entirety.

TECHNICAL FIELD

The following disclosure relates generally to techniques for automatically determining and providing information about dwellings within geographical regions specific to indicated locations, such as to automatically respond to a free-form natural language search request for information about dwellings of one or more types within an indeterminate distance from one or more indicated point-of-interest locations by determining and using individualized geographical search regions specific to each point-of-interest location.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas (e.g., buildings of various types). In addition, various other information is available via other communication mediums. However, existing search engines and other techniques for identifying information of interest suffer from various problems. Non-exclusive examples include a difficulty in understanding natural language requests, difficulty in providing accurate information that is specific to a particular topic of interest, difficulty in limiting information requests to approved topics, etc.

BRIEF DESCRIPTION OF THE DRAWINGS

FIGS. 2A-2D illustrate examples of performing described techniques, including automatically responding to a free-form natural language request for information about dwellings within an indeterminate distance from one or more indicated point-of-interest locations by determining and using individualized geographical search regions specific to each point-of-interest location.

DETAILED DESCRIPTION

Figure 1A:
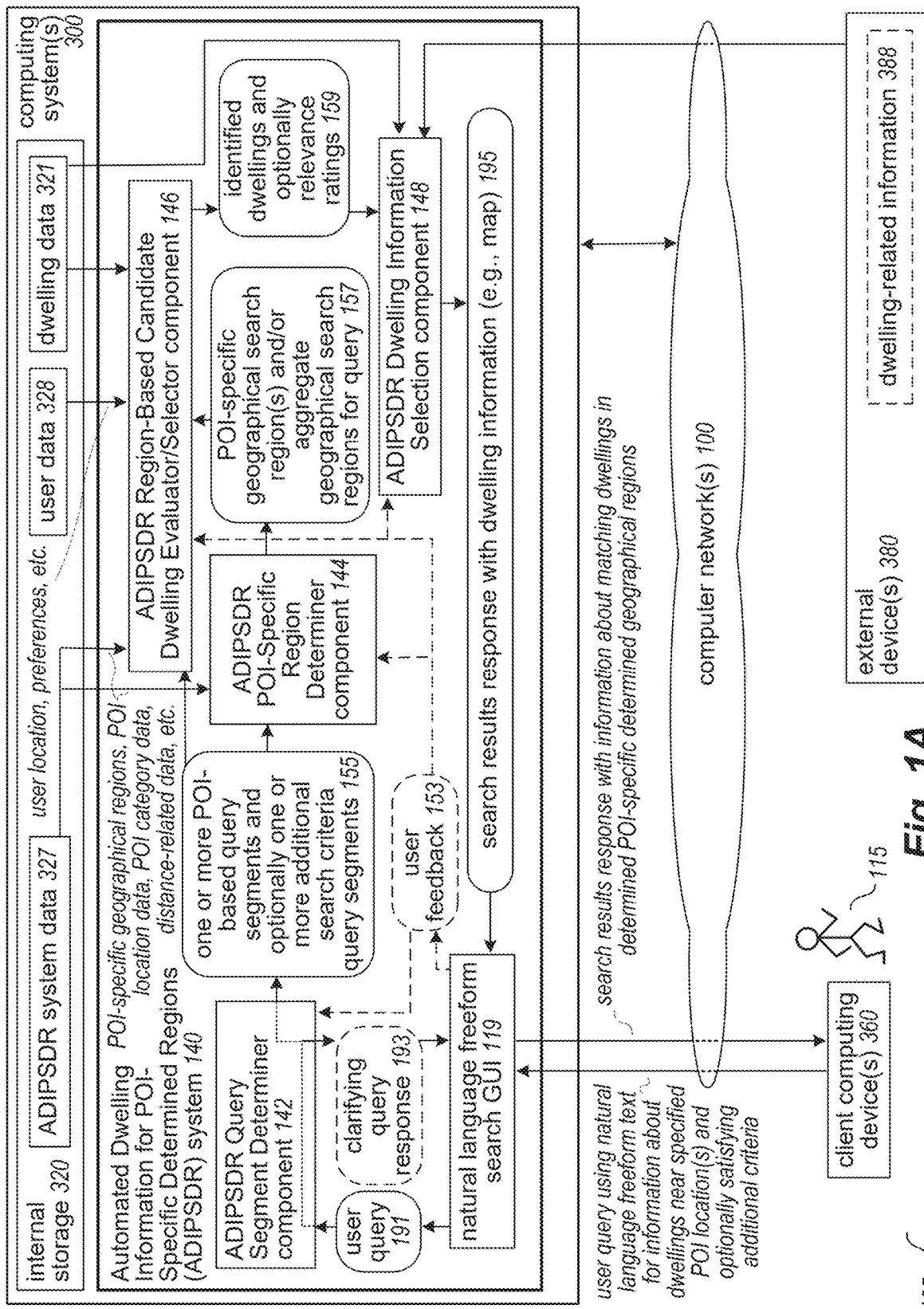
FIGS. 1A-1C are network diagrams illustrating an example system for performing described techniques, including automatically responding to a free-form natural language request for information about dwellings within an indeterminate distance from one or more indicated point-of-interest locations by determining and using individualized geographical search regions specific to each point-of-interest location.

The present disclosure describes techniques for using computing devices to perform automated operations involving automatically determining and providing information about dwellings within geographical regions specific to indicated locations, such as in at least some embodiments to automatically respond to a free-form natural language search request for information about dwellings within an indeterminate distance from one or more indicated point-of-interest (POI) locations by determining and using individualized geographical search regions specific to each such POI location. In at least some embodiments, the described techniques include initially determining, for each of a plurality of POI locations (also referred to at times herein as "POIs") in one or more geographical areas (e.g., cities, counties, states, neighborhoods, etc.), a geographical region specific to that POI location in an individualized manner for that POI location using one or more attributes of that POI location, such as to represent a geographical region around some or all of that POI location that includes additional locations (e.g., dwellings) determined to be nearby that POI location—the determination of such POI-specific nearby geographical regions may be performed in various manners, as discussed further below. After the initial determination of POI-specific nearby geographical regions, the described techniques may include receiving a search query that specifies multiple search criteria using a sequence of multiple free-form natural language terms, and segmenting the multiple free-form natural language terms into multiple segments that each corresponds to one of the search criteria, such as to include segments that indicate at least one POI location and at least one type of dwelling (e.g., houses, homes, apartments, condominiums, etc.) and at least one indeterminate distance from the POI location(s) (e.g., "nearby" or analogous terms), as well as various other optional types of information such as dwelling-related attributes (e.g., number of bedrooms and/or bathrooms, square footage, property size, etc.), conjunctive (e.g., "and") and/or disjunctive (e.g., "or") terms to connect two specified search criteria, etc. The described techniques may further, for each POI location indicated in a search query, uniquely identify that POI location, determine a geographical search region for that POI location (such as by selecting a predefined POI-specific nearby geographical region for that POI location), identify one or more dwellings within that geographical search region that satisfy the multiple specified search criteria (e.g., that include or otherwise match any indicated dwelling-related attributes), and determine and provide corresponding information for the identified dwelling(s)—in cases in which the multiple search criteria include one or more conjunctive and/or disjunctive terms, the determination of geographical search region(s) for the search query may further use those terms to identify and use an aggregate geographical region in at least some embodiments, as discussed further below. Additional details are included below regarding automatically responding to a free-form natural language dwelling search request specifying at least a POI location, and some or all of the techniques described herein may, in at least some embodiments, be performed via automated operations of an Automated Dwelling Information for POI-Specific Determined Regions ("ADIPSDR") system, as discussed further below.

As noted above, the automated operations of the ADIPSDR system in at least some embodiments include, for a received query using multiple free-form natural language terms to specify one or more search criteria, segmenting the terms in the received query into one or more segments each corresponding to an indicated search criterion. Such segmenting of the sequence of term(s) may be performed in various manners in various embodiments, such as by identifying matches in one or more dictionaries (e.g., general-purpose dictionaries, dictionaries of POI location names, dictionaries of geographical area names, etc.) or other lists of word/phrase breaks, by considering each combination of singleton terms and two or more adjacent terms to determine if they match POI locations or geographical areas (e.g., for a sequence of terms such as "Space Needle Seattle", considering alternative name-based designations of "Space", "Needle", "Seattle", "Space Needle", "Needle Seattle", and "Space Needle Seattle", and concluding that "Space" is grouped with "Needle" to identify a POI location name, leaving the name-based designation of "Seattle" to identify a surrounding geographical area that together uniquely identify the POI location, such as to differentiate the Space Needle in Seattle from other space needles in other geographical areas), etc. In some embodiments, each combination of terms is treated as a separate segment (e.g., for a sequence of terms such as "Stamford New York", using all of "Stamford", "New", "York", "Stamford New", "New York" and "Stamford New York" as separate segments), or search queries may be parsed without using such segments. In addition, in some embodiments and situations, the received query may, in addition to the multiple segments each corresponding to a geographical area or a POI location, include one or more additional segments for one or more additional search criteria of one or more types, such as one or more of the following: dwelling-type designations (e.g., 'apartment', 'single family house', 'condominium', etc.); POI categories (e.g., "beaches", "parks", "schools", "hospitals", "lakes", etc.); indeterminate distance indications that are associated with one or more POI locations and/or POI categories (e.g., "nearby" or analogous terms such as "near", "by", "around", "at", "close to", "adjacent", etc.; a travel-based distance measure with an indicated travel type, such as walking or bicycling or scootering or driving or bus or train or light rail or mass transit; etc., and an associated amount of travel time that is specified or otherwise determined); non-location-related search filters or other search criteria, such as search criteria related to dwelling attributes (e.g., minimum and/or maximum and/or target price, number of bathrooms, number of bedrooms, etc.), etc. In some embodiments and situations, a received query may include only an indication of a POI location or a POI category, and other search criteria such as geographical area and/or dwelling type and/or indeterminate distance and/or other dwelling-related attributes may be automatically determined for use with the search query (e.g., inferred, selected as a default, etc.), optionally based on information specific to a user who submitted the search query and/or a current context (e.g., as part of an ongoing search interaction session by using previously specified details). Additional details are included below related to analyzing a sequence of one or more terms of a received query that is specified using free-form natural language and that includes at least one POI location and/or POI category, including with respect to the non-exclusive examples of FIGS. 2A-2D.

As is also noted above, the automated operations of the ADIPSDR system in at least some embodiments include initially determining, for each of a plurality of POI locations in one or more geographical areas, a geographical region specific to that POI location in an individualized manner for that POI location, such as to represent a geographical region around or otherwise for that POI location that includes additional locations (e.g., dwellings) considered to be nearby that POI location. In at least some embodiments, the determination of such a POI-specific nearby geographical region for a particular POI location is based on one or more attributes of that POI location, such as one or more of the following non-exclusive list: a category of the POI location (e.g., beach, lake, school, park, hospital, etc.), such as to have different defined distances associated with each POI category that represent locations 'near' a POI location of that POI category; a type of the one or more geographical areas in which that POI location is located (e.g., urban, suburban, rural, etc.), such as to have different defined distances associated with each type of geographical area that represent locations 'near' a POI location in that type of geographical area; a shape of that POI location (e.g., a single GPS point location; a regular or irregular geometric two-dimensional or three-dimensional shape, such as circles or ovals or squares or rectangles for a regular two-dimensional geometric shape, and represented by a group of GPS point locations, such as for some or all of a boundary, or instead by a single GPS point location to represent such a shape, such as a center; a two-dimensional line or three-dimensional wall; etc.), such as to have different defined distances associated with each type of POI location shape that represent locations 'near' a POI location of that POI location shape; etc. In embodiments in which multiple POI location attributes are used to determine the size for a POI-specific nearby geographical region (also referred to at times herein as a "POI-specific geographical region"), the sizes associated with different such attributes may be combined in various manners in various embodiments, such as to use an average (e.g., a weighted average), a maximum, a minimum, etc. In addition, in some embodiments each of some or all POI locations may have multiple predefined POI-specific nearby geographical regions, such as to correspond to geographical regions that are 'near' that POI location for each of multiple travel types (e.g., walking, cycling, scootering, driving, bus, train, light rail, mass transit, etc.) and/or associated travel times (e.g., 'within 5 minutes walking', 'within 10 minutes walking', . . . , 'within 5 minutes driving', 'within 10 minutes driving', etc.), and/or that are 'near' that POI location for other factors (e.g., based on time-of-day, day-of-week, month, season, etc.). Furthermore, in some embodiments a POI-specific nearby geographical region for a POI location may be generated using a consistent defined size to encircle a boundary of that POI location's shape, while in other embodiments may be approximated in other manners (e.g., using a bounding box or bounding circle or other bounding shape), using different sizes for different portions of a boundary of that POI location, etc. In addition, in some embodiments a predefined POI-specific nearby geographical region for a POI location may be adjusted or otherwise modified for use with a particular search query, such as to reflect explicit or implicit preferences of a user who submitted the search query (e.g., to increase or decrease the geographical region boundaries for a user who has a more expansive or restrictive, respectively, conception of 'nearby' than average or typical). Additional details are included below related to determining and using a predefined POI-specific geographical region for a POI location, including with respect to the non-exclusive examples of FIGS. 2A-2D.

As is also noted above, the automated operations of the ADIPSDR system in at least some embodiments include managing received search queries that specify an indeterminate travel-based distance that includes at least a travel type and optionally a travel time—in cases in which a travel time is not indicated (e.g., "within walking distance of"), the ADIPSDR system may select a travel time to use, such as specific to that travel type or instead the same for all travel types, based on information specific to the user who submitted the query, etc. The system may determine geographical distances associated with such a travel-based distance in various manners in various embodiments, such as to use geographical mapping/travel functionality to determine additional locations that are reachable from each of some or all GPS boundary locations associated with that POI location when using that travel type for that travel time, combine the additional locations that are determined for all of the POI location boundary, and determine a geographical region that includes all those additional locations (e.g., a smallest enclosing geographical region)—as one example, if using a travel type that corresponds to roads (e.g., walking, driving, bicycling, scooting, etc.), the determination of the additional locations may include moving outward from the POI location's boundaries along all roads in a widening search at each road junction until all possible locations reachable within that travel time for that travel type are identified. In other embodiments and situations, nearby geographical region boundaries specific to particular POI locations may be determined in other manners, such as to estimate one or more geographical distances corresponding to a given travel type and travel time, and to use such estimated geographical distance(s) in generating a POI-specific nearby geographical region for a particular POI location. Additional details are included below related to using specified travel-based distances, including with respect to the non-exclusive examples of FIGS. 2A-2D.

As is also noted above, the automated operations of the ADIPSDR system in at least some embodiments include managing received search queries that specify a POI category, such as instead of or in addition to a particular POI location. In at least some embodiments, in order to manage such a specified POI category, one or more geographical areas associated with such a search query are determined, whether as specified in the search query or instead in other manners (e.g., specific to a user who submitted the search query, such as based on the user's location and/or other user preferences; based on a context of previous interactions during an interactive search session; etc.). After the one or more geographical areas are determined, each POI location within those one or more geographical areas of that POI category are identified, and may then each be used as an alternative POI location for the search, such as to individually use the predefined POI-specific nearby geographical region for each such POI location in order to identify potentially matching dwellings in that geographical region.

In addition, in at least some embodiments and situations, the speed and/or accuracy of identifying dwellings that are within the POI-specific nearby geographical region for a particular POI location or for multiple such POI locations of a particular POI category is enhanced by predefining one or more attributes for each of some or all dwellings that associate that dwelling with the particular POI locations (if any) for which that dwelling falls within their respective predefined POI-specific nearby geographical regions, or that associate that dwelling with the particular POI categories (if any) for which that dwelling falls within the respective predefined POI-specific nearby geographical region for at least one particular POI location of that POI category—in such situations, the identification of a dwelling corresponding to a particular POI location or a particular POI category in a particular geographical area may include reviewing each dwelling in that geographical area to determine if it includes one or more such attributes that associate that dwelling with that particular POI location or POI category. Additional details are included below related to using specified POI categories and to predefining associations of dwellings with particular POI locations and/or POI categories, including with respect to the non-exclusive examples of FIGS. 2A-2D.

As is also noted above, the automated operations of the ADIPSDR system in at least some embodiments include managing received search queries that specify one or more conjunctive and/or disjunctive terms that each connects two surrounding or otherwise adjacent search criteria (e.g., criteria A 'and' criteria B, criteria A 'or' criteria B, etc., in which A and B may be criterion such as POI location, POI category, dwelling type, geographical area, etc.). In at least some embodiments and situations, when a disjunctive term is used to connect two search criteria that each has one or more associated geographical regions (e.g., POI location 1 or POI location 2, POI location 1 or POI category 1, POI category 1 or POI category 2, etc.), an aggregate geographical region may be determined and used that is the set-based union of the two or more associated geographical regions for the two search criteria, such as an aggregate geographical region that includes multiple separated individual geographical regions within it, or instead an aggregate geographical region that is the superset of all of the individual geographical regions as well as the intervening areas between them. Similarly, in at least some embodiments and situations, when a conjunctive term is used to connect two search criteria that each has one or more associated geographical regions (e.g., POI location 1 and POI location 2, POI location 1 and POI category 1, POI category 1 and POI category 2, etc.), an aggregate geographical region is determined and used that is the set-based intersection of the two or more associated geographical regions for the two search criteria, such as an aggregate geographical region that includes only those locations belonging to all of the two or more associated geographical regions. In other embodiments, no such aggregate geographical region may be used, and instead the identification of dwellings may be performed for each of the two or more associated geographical regions for the two search criteria, with the resulting identified dwellings subsequently combined using the appropriate union or intersection for the corresponding disjunctive or conjunctive term, respectively. Other geographical constraints may similarly be specified and used, such as "within walking distance of" types of locations (e.g., highly rated restaurants), including with respect to conjunctive and disjunctive terms, and the determination of resulting geographical search regions may be similarly determined. Additional details are included below related to using conjunctive and disjunctive terms, including with respect to the non-exclusive examples of FIGS. 2A-2D.

As is also noted above, the automated operations of the ADIPSDR system in at least some embodiments include, after determining one or more predefined POI-specific nearby geographical regions to use for one or more POI locations to use as one or more geographical search regions for a user query, using the determined geographical search region(s) to determine and provide responsive information for the received query, such as information about one or more identified dwellings that are in the geographical search region(s) and thus proximate to the respective POI location (s). As one non-exclusive example, dwellings may be identified that are located in the determined geographical search region(s) and that further satisfy any additional optional specified non-location-related search filters or other search criteria (e.g., included in the received query). The identified dwellings may be further filtered and/or ranked in various manners, such as using one or more of the following: proximity to the POI location(s); one or more additional non-location-related search filters or other search criteria specified in the query; one or more user preferences of a user who submitted the received query, such as to improve the ranking of dwellings for closer matches with the user preference(s); etc. After such filtering and/or ranking, a subset of one or more of the remaining identified dwellings may further be selected in some embodiments (e.g., a top Y, where Y is a defined quantity threshold, such as 1 or 10 or 100; a top Y %, where Y is a defined percentage threshold, such as 1% or 5% or 10%; etc.), while in other embodiments all remaining identified dwellings may be selected-if multiple such identified dwellings are selected, they may be further provided in a ranked manner, such as with a highest-ranked dwelling first. In other embodiments and situations in which results are provided in a manner overlaid on or otherwise in association with a map, the indicated dwellings may not be ranked, or rankings may be indicated using visual cues for respective dwellings (e.g., using sizes, colors, highlighting, flashing, etc.). Responsive information for the query that includes the one or more identified dwellings may further be provided in various manners in various embodiments, such as in a GUI (graphical user interface) displayed to a user who submitted the query via the GUI. In addition, it will be appreciated that various types of information may be provided for an identified dwelling, such as images, textual descriptions, 3D models and other floor plans, prices, statistical data (e.g., square feet, quantity of bedrooms and bathrooms, etc.), videos, comments and other user-generated data, etc., that types of information may be selected to be provided in various manners (e.g., based on instructions received in the search query, using user preferences, using defaults unless otherwise specified, etc.), and that the GUI may provide functionality to enable a user to obtain further information about one or more dwellings selected by the user. Additional details are included below related to determining and providing responsive information for a received query, including with respect to the non-exclusive examples of FIGS. 2A-2D.

The described automated techniques provide various benefits in various embodiments, including to significantly improve the identification and use of responsive information to specified queries for information about dwellings in indicated locations, including queries specified in a natural language format and/or with indeterminate distances from indicated POI locations, and such as to more accurately determine the intended POI locations and associated geographical regions based on the terms specified in the query. Such automated techniques also allow such responsive answer information to be generated much more quickly and efficiently than previously existing techniques (e.g., using less storage and/or memory and/or computing cycles) and with greater accuracy, based at least in part on using the described techniques for determining intended POI locations and associated geographical regions, including by predefining POI-specific nearby geographical regions for particular POI locations, etc. In addition, in some embodiments the described techniques may be used to provide an improved GUI in which a user may more accurately and quickly obtain information, including in response to an explicit request (e.g., in the form of a natural language query), as part of providing personalized information to the user, etc. Various other benefits are also provided by the described techniques, some of which are further described elsewhere herein.

Figure 1B:
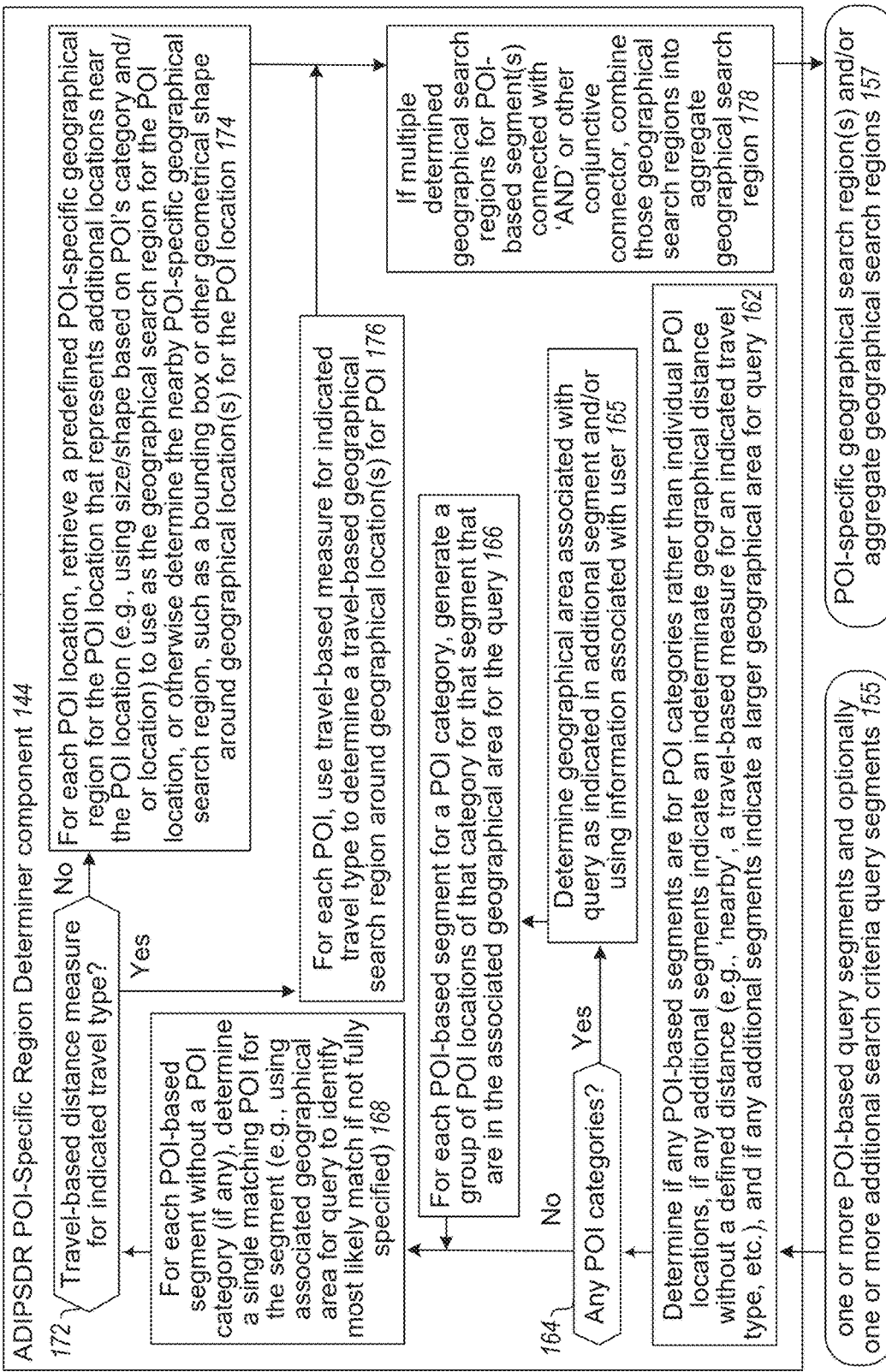
Figure 1C:
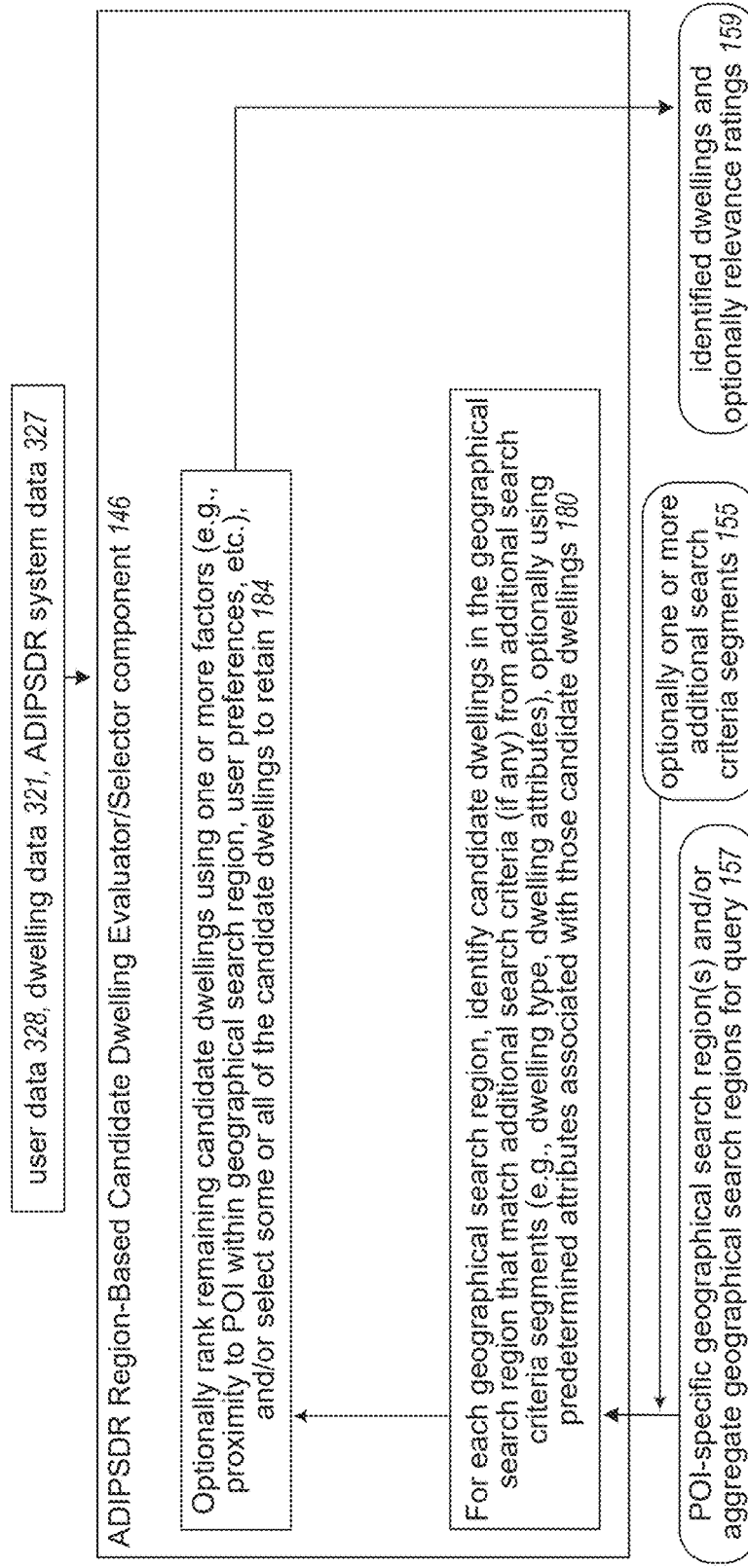

FIGS. 1A-1C are network diagrams illustrating an example system for performing described techniques, including automatically responding to a free-form natural language dwelling information request having one or more indicated POI locations and optionally additional search criteria that may include an indeterminate distance associated with the POI location(s), by using automated tools to determine the intended POI locations and associated geographical search regions for use in generating and providing responsive dwelling information.

In particular, FIG. 1A illustrates information 105a about an example embodiment of an ADIPSDR system 140 executing on one or more computing systems 300, and interacting over one or more computer networks 100 with one or more client computing devices 360, such as to receive query requests from users 115 of the client computing devices for information about dwellings and to provide corresponding responses with requested dwelling information (e.g., as part of search results). In the illustrated embodiment, the computing systems 300 may store various information on storage 320 that is used by the ADIPSDR system during operation, including dwelling data 321 about dwellings in various geographical areas (e.g., in one or more countries, states, cities, etc., and optionally including information about attributes of dwellings that indicate associations with particular POI locations and/or POI categories), user data 328 (e.g., user location; user preferences, such as expressly specified and/or implicitly determined from past activities of the user such as viewing or otherwise interacting with information about dwellings; etc.), and ADIPSDR system data 327 (e.g., stored in one or more databases, such as about names and locations of POI locations, information about predefined POI-specific nearby geographical regions for POI locations, information about POI categories and associated POI locations, data for use in determining distances of one or more types between two or more geographical locations, information for use in segment determination such as word-break and/or phrase-break vocabularies, etc.). The ADIPSDR system may further retrieve and use other dwelling-related information 388 of one or more types stored externally to the computing systems 300, such as accessed over the one or more computer networks 100 from one or more external computing and/or storage devices 380, whether in addition to or instead of information stored on storage 320.

As one example of operations of the ADIPSDR system 140, a particular user 115 of one of the client computing devices 360 may supply a query 191 about dwellings of interest to a natural language free-form input GUI 119 provided by the ADIPSDR system. The GUI provides the user query to an ADIPSDR Query Segment Determiner component 142, which analyzes the user query to attempt to identify one or more segments within the query corresponding to at least one POI location and optionally additional search criteria-if the component is unable to identify such segments, such as due to the received query lacking a correct format or types of information or due to having other problems, the component instead generates and returns a clarifying query response 193 to the GUI 119 to request further information from the user and/or to indicate an inability to respond. Otherwise, the component 142 forwards the determined one or more segments 155 to the ADIPSDR POI-Specific Region Determiner component 144, which uses information from the system data 327 to determine one or more geographical search regions corresponding to the query, such as by using the predefined POI-specific nearby geographical region for each indicated POI location as a geographical search region (or by using the predefined POI-specific nearby geographical region for each POI location of an indicated POI category within a geographical search area), and/or by optionally determining one or more aggregate geographical search regions generated by combining two or more such predefined POI-specific nearby geographical region according to one or more conjunctive and/or disjunctive search terms, and to provide such determined geographical search region(s) 157 to the ADIPSDR Region-Based Candidate Dwelling Evaluator/Selector component 146-FIG. 1B provides further details related to one example embodiment of such a component 144. The component 146 uses the system data 327 as well as optionally user data 328 to identify one or more dwellings in the determined geographical search region(s) that satisfy the search criteria of the user query, and to optionally rank or otherwise determine relevance of the identified dwelling(s)—FIG. 1C provides further details related to one example embodiment of such a component 146. The component 146 then provides information about the identified dwelling(s) and optionally relevance ratings 159 to the ADIPSDR Dwelling Information Selection component 148, which selects one or more representative types of information for each dwelling, and generates a search results response information 195 with visual representations of the identified dwelling(s) and their selected information (e.g., a list of multiple dwellings, such as in a ranked order and showing the selected information about each dwelling; a map of a geographical area that includes the geographical search region(s) 157 and on which visual representations and/or other information about the identified dwelling(s) is overlaid or otherwise indicated; etc.). After the query response 195 with the dwelling information is generated by the component 148, or if the component 142 instead generates a clarifying query response 193 without forwarding the query segments 155 to the component 144, the generated query response 195 or 193 is provided via the GUI 119 to the client computing device of the user who submitted the query, such as for display on the client computing device as part of the GUI.

The same user may then provide one or more subsequent queries 191 to the GUI 119 as part of an ongoing search interaction session, such as with similar processing performed for the subsequent user queries, and optionally with the context of prior interactions during the session being maintained and used by the ADIPSDR system. In addition, a user may in some embodiments and situations provide optional user feedback 153, such as to indicate that incorrect POI locations or other search criteria have been determined for the user query, to otherwise provide feedback regarding accuracy of search results response 195 or to provide further clarifying information in response to a clarifying query response 193, to specify further user preferences to be used, etc. If so, such optional user feedback 153 may be forwarded to the components 142 and/or 144 and/or 146 and/or 148, such as to improve future determinations performed by the components. In other embodiments and situations, some or all such feedback may instead be implicit feedback that is determined based on an analysis of subsequent user queries (e.g., to indicate that a prior query response did not provide information that the user was seeking) and/or of prior user queries (e.g., to determine user preferences and/or user location, such as based on patterns in the prior user queries). While the example discussed above involves a single user performing multiple interactions with the ADIPSDR system as part of an interaction session (e.g., spanning seconds, minutes, hours, days, etc.), it will be appreciated that the ADIPSDR system may in at least some embodiments and situations be concurrently interacting with many users using different client computing devices, such as to maintain a separate GUI and interaction session history for each such user, and that a new interaction session may be initiated for a user after one or more prior interaction sessions with that user in various manners (e.g., based on a corresponding user instruction, such as to reflect a change in the types of dwelling information of interest; as determined automatically by the ADIPSDR system, such as to reflect a change in the types of dwelling information being requested, or due to a defined period of time since a last user interaction being exceeded, such as one or more days; etc.).

Figure 3:
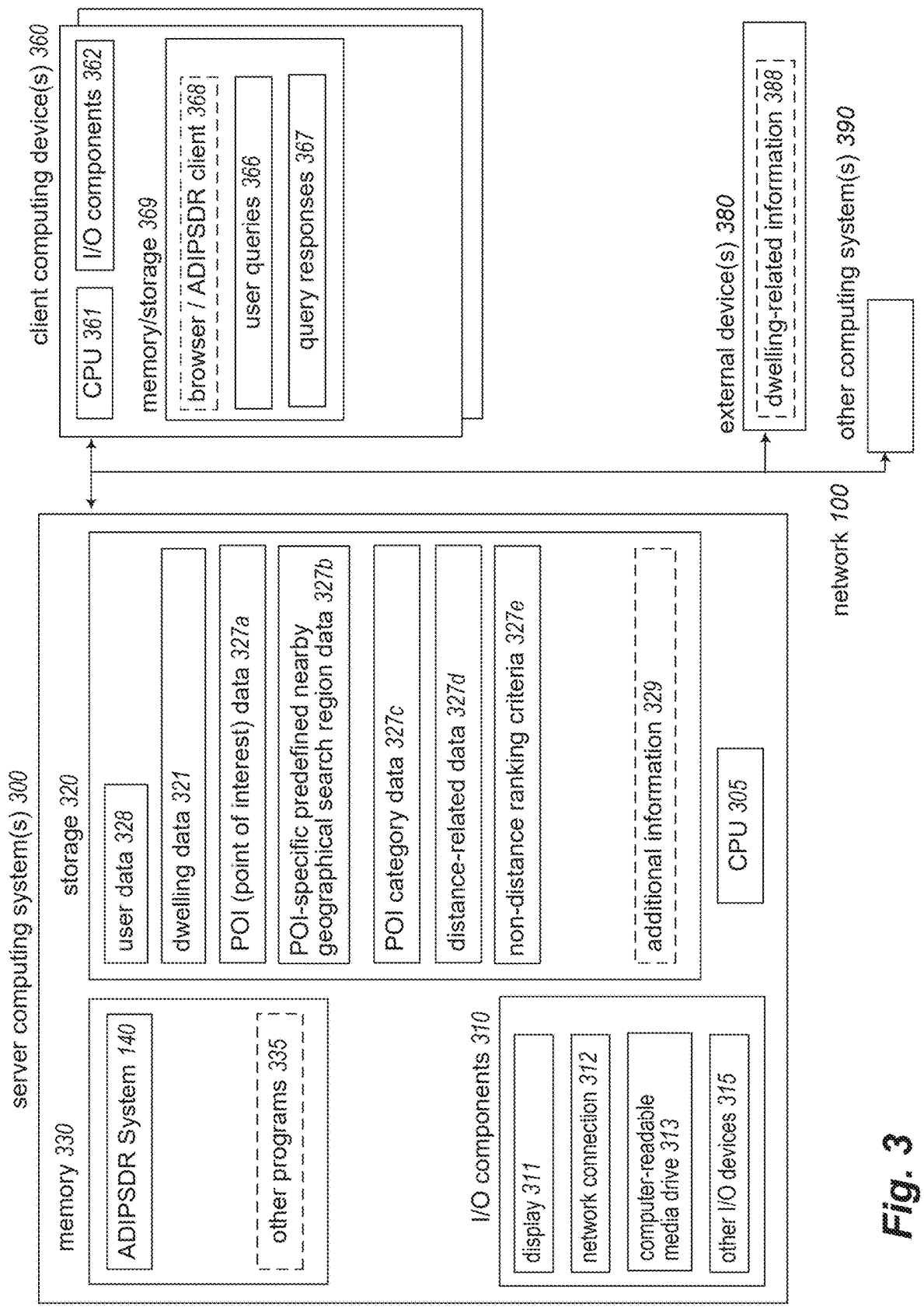
FIG. 3 is a block diagram illustrating an example of a computing system for use in performing described techniques, including automatically responding to a free-form natural language request for information about dwellings within an indeterminate distance from one or more indicated point-of-interest locations by determining and using individualized geographical search regions specific to each point-of-interest location.

In addition, the computing system(s) 300 may include various other components and functionality, as discussed in greater detail elsewhere herein, including with respect to FIG. 3. The computer networks 100 may similarly be of various types in various embodiments and may include various types of wired and/or wireless segments, including one or more publicly accessible linked networks (e.g., operated by various distinct parties, such as the Internet) and/or a private network (e.g., a corporate or university network that is wholly or partially inaccessible to non-privileged users), including in some cases to have both private and public networks (e.g., with one or more of the private networks having access to and/or from one or more of the public networks).

FIG. 1B continues the example of FIG. 1A, and illustrates information 105b for one example embodiment of the ADIPSDR POI-Specific Region Determiner component 144 discussed in FIG. 1A. In particular, in the illustrated embodiment, the component 144 performs various activities to determine one or more geographical search regions corresponding to a search query, and in particular geographical search region(s) corresponding to one or more segments 155 from the search query that include at least one POI-based segment identifying at least one POI location and optionally one or more other segments identifying additional search criteria.

In operation, the component 144 receives as input the determined query segment(s) 155, and in block 162 analyzes the received query segments in order to determine if any of the POI-based segments are for POI categories rather than individual POI locations, if any of the optional additional segments indicate an indeterminate distance without a specified defined distance (e.g., "nearby", a travel-based distance measure, etc.), and if any of the optional additional segments indicate a larger geographical area to which the query applies. In block 164, the routine determines if any POI categories were identified, and if not continues to block 168. Otherwise, the routine continues to block 165 to determine the geographical area associated with the query, such as is indicated in an additional query segment and/or by using information associated with the user. In block 166, the routine then, for each POI-based segment for the indicated POI category, generates a group of any POI locations of that category that are in the associated geographical area for the query, including to perform those operations for each indicated POI category if there are multiple. After block 166, or if it is determined in block 164 that there were not any POI categories, the routine in block 168, for each POI-based segment without a POI category (if any) determines a single matching POI location for the segment, such as by optionally using the associated geographical area for the query to identify the most likely match if the POI location is not fully specified in the information included for it in the query.

After block 168, the routine in block 172 determines if the search query includes a travel-based distance measure for an indicated type of travel, and if so continues to block 176 to, for each POI location, use the travel-based distance measure for the indicated travel type to determine a travel-based geographical search region around one or more geographical locations associated with the POI location (e.g., multiple geographical locations along a boundary of the POI location, a single representative geographical location for the POI location, etc.). If it is instead determined in block 172 that the search query does not include a travel-based distance measure, the routine instead continues to block 174 to, for each POI location, retrieve a predefined POI-specific nearby geographical region for the POI location that represent locations near the POI location (e.g., using a size and/or shape for the geographical region that is based on the POI location's category and/or location) to use as an associated geographical search region for that POI location, or otherwise determines a POI-specific geographical search region for that POI location (e.g., a bounding box or other geometrical shape around one or more geographical locations for the POI location). After blocks 174 or 176, the routine continues to block 178 to, if the search query includes multiple criteria with associated geographical search regions that are connected with a conjunctive or disjunctive term, optionally combine those geographical search regions into an aggregate geographical search region according to the indicated term, as discussed in greater detail elsewhere herein. The determined geographical search region(s) from blocks 174 or 176 or the aggregate geographical search region from block 178 (if any) is then provided as output in block 157.

FIG. 1C continues the example of FIGS. 1A-1B, and illustrates information 105c for one example embodiment of the ADIPSDR Region-Based Candidate Dwelling Evaluator/Selector component 146 discussed in FIG. 1A. In particular, the component 146 performs various activities in the illustrated embodiment to receive one or more determined geographical search region(s) 157 for the user query, and to identify one or more dwellings in the search region(s) that satisfy the search criteria of the user query.

In operation, the component 146 receives as input the one or more determined geographical search region(s) 157 and any additional search criteria corresponding to the search criteria (e.g., dwelling-related attributes), and in block 180, for each geographical search region, identifies any candidate dwellings in the geographical search region that match additional search criteria (if any) from the optional additional search criteria segments, such as according to dwelling type, other dwelling attributes, etc., or instead selects all candidate dwellings in the geographical search region if additional search criteria are not provided-if the candidate dwellings have associated attributes corresponding to POI locations and/or POI categories, such attributes may be used to determine that the candidate dwellings are within the geographical search regions corresponding to associated POI locations and/or a POI category. In block 184, the routine then optionally ranks the remaining candidate dwellings using one or more factors, such as proximity to the POI location within the geographical search region, user preferences, etc., and in some cases may select a subset of candidate dwellings to retain. The remaining candidate dwellings and optionally associated relevance rankings from block 184 are then provided as output in block 159.

It will be appreciated that various details are provided with respect to FIGS. 1A-1C for illustrative purposes, and are not intended to limit the scope of the invention unless otherwise indicated. Similarly, additional exemplary details are provided with respect to FIGS. 2A-2D and elsewhere herein, and such details are similarly provided for illustrative purposes and are not intended to limit the scope of the invention unless otherwise indicated.

FIGS. 2A-2D illustrate examples of performing described techniques, including automatically responding to a free-form natural language search request for information about dwellings, such as within an indeterminate distance from one or more indicated point-of-interest (POI) locations by determining and using individualized geographical search regions specific to each such POI location.

In particular, FIG. 2A illustrates information 205a including an example client computing device 360 (in this example, a smartphone) that is being used by a user (not shown) to interact with a GUI provided by the ADIPSDR system, with current information 206 displayed in the GUI. In this example, an initial greeting screen is shown that includes a user selectable control 210a via which a user may sign in, as well as instructions regarding how to supply queries via the GUI. In this example, the user begins by entering an initial query 215a that includes a sequence of 4 natural language free-form terms of "homes near Lake Sammamish", and the ADIPSDR system has provided corresponding response information 220a, as well as an indication of the system's interpretation 217a of the natural language free-form terms along with a user-selectable control 218a for the user to indicate if the interpretation is incorrect. In this example, the terms "Lake Sammamish" are interpreted as a POI location corresponding to a lake in northern Washington state east of Seattle, the term "homes" is interpreted as a dwelling type indicator, and the term "near" is interpreted as an indeterminate distance associated with the POI location. In this example, the POI location for Lake Sammamish is bordered by multiple cities, and a determined POI-specific nearby geographical region for the POI location extends around the shape of the lake, as discussed further with respect to FIG. 2B. In this example, the matching home dwellings identified for the search query are shown in list format, with several types of identified information included for each search result, such as number of bedrooms, number of bathrooms, number of square feet of the dwelling, associated price, etc., as well as am address that is a user-selectable control with which the user can select to obtain information specific to a particular dwelling.

FIG. 2A further illustrates a second search query 215b that is similar to search query 215a, but in which additional search criteria are specified using additional natural language free-form terms to indicate a number of minimum bedrooms and a number of bathrooms to include in the matching candidate dwellings. In response, the ADIPSDR system generates and provides response information 220b that differs relative to information 220a by removing results 1, 3 and 4 in response 220a that do not meet the additional specified search criteria, while adding additional results that do match the additional search criteria and are within the POI-specific nearby geographical region for the Lake Sammamish POI location.

FIG. 2B continues the example of FIG. 2A, and illustrates information 205b showing an alternative response to search query 215a, in which the search response information 220c in FIG. 2B is provided in the form of a map that includes a visual indicator 219 of the POI-specific geographical search region used for the Lake Sammamish POI location, and with the search results shown as yellow visual indicators overlaid on the map for each candidate dwelling that in this example are user-selectable controls with which the user can select to obtain more information about a respective dwelling. It will be appreciated that in this example the POI-specific nearby geographical region for the Lake Sammamish POI location has a shape that is nonuniform but that is similar to the shape of the POI location itself, although with different distances from the boundary of the lake being used (e.g., based on one or more associated attributes for that POI location and/or for the dwellings, such as to include dwellings that have views of the lake, dwellings from which a publicly accessible area of the lake can be reached within a defined amount of time, etc.). FIG. 2B further indicates 210b that a particular user has signed—in, such that user-specific information may be used in various manners as discussed in greater detail elsewhere herein.

FIG. 2C continues the examples of FIGS. 2A-2B, and illustrates information 205c showing additional example search queries and associated responses by the ADIPSDR system, such as alternative starting queries that could be used instead of search query 215a. In this example, the additional search queries include search query 215c, in which a dwelling type of apartments is indicated and in which the indicated POI location is a particular school in Seattle, with corresponding response information 220d shown. The additional search queries further include search query 215d, which is similar to search query 215a, but in which a different free-form term is used to indicate an indeterminate distance related to the Lake Sammamish POI location, such as one of various alternatives including "at", "by", "close to", "around", "nearby", etc.—it will be appreciated that a variety of other types of indeterminate distance natural language free-form search terms may similarly be used. In this example, the respective search results 220e will be the same as those of 220a due to selecting and using the same predefined POI-specific nearby geographical region for the Lake Sammamish POI location, although only a portion of the search results are shown in this example for the sake of brevity. The additional search queries further include search query 215e, in which a POI category of "lakes" is specified rather than a specific POI location, as well as a geographic area of "Seattle" being used in this example. Accordingly, the response information 220f will identify candidate dwellings in Seattle near various POI locations that are lakes within or bordering the city. The additional search queries further includes example search query 215f, which indicates the use of a travel-based distance measure of "within five minutes XXX", where XXX is a travel type such as one of "drive", "walk", "mass transit", etc., with corresponding response information 220g—it will be appreciated that a variety of other types of travel type natural language free-form search terms may be used, and that a travel-based indeterminate distance may be specified in other manners (e.g., "within walking distance of", "walkable to", "within driving distance of", etc.).

FIG. 2D continues the examples of FIGS. 2A-2C, and illustrates information 205d showing further example search queries and associated responses by the ADIPSDR system, such as further alternative starting queries that could be used instead of search query 215a. In this example, the further additional search queries include search query 215g, which is similar to search query 215f in using a travel-based indeterminate distance, but in which a POI category of "lakes" is used instead of a specific POI location, as well as further indicating a geographical search area for the search query, and with corresponding response information 220h being shown. The further additional search queries also include search query 215h, in which a disjunctive term "or" connects two POI locations, which in this example are two particular lakes in the greater Seattle area-accordingly, when determining the response information 220i, the ADIPSDR system may use the two POI-specific nearby geographical search regions for the two POI locations, and merge the candidate dwellings identified for each as part of the response information, while in other embodiments and situations may determine a single aggregate search region based on those two POI-specific nearby geographical search regions for the two POI locations and identify candidate dwellings within that aggregate geographical search region. The further additional example search queries also include search query 215i, in which conjunctive term "and" is used to connect the terms of search query 215a with an additional search criteria including highly rated restaurants with an associated indeterminate travel-based distance of "within walking distance of", such that the corresponding response information 220j is determined for a subset of the POI-specific nearby geographical search region shown in FIG. 2B that corresponds to particular subregions identified as corresponding to the additional search criteria.

It will be appreciated that the examples of FIGS. 2A-2D are provided for illustrative reasons only, and are not intended to limit the scope of the invention. For example, a variety of other combinations of natural language free-form search terms may be used in other embodiments and situations.

For illustrative purposes, some embodiments are described herein in which specific types of information are acquired, used and/or presented in specific ways using specific types of data structures and by using specific types of devices-however, it will be understood that the described techniques may be used in other manners in other embodiments, and that the invention is not limited to exemplary details provided. As one non-exclusive example, specific types of data structures and algorithms are generated and/or used in specific manners in some embodiments, but it will be appreciated that other types of information may be generated and used in other manners in other embodiments, including for types of information other than dwelling information. Similarly, while particular user interface display and interaction techniques are shown, other user interaction techniques may be used in other embodiments. In addition, various details are provided in the drawings and text for exemplary purposes, but are not intended to limit the scope of the invention—for example, sizes and relative positions of elements in the drawings are not necessarily drawn to scale, with some details omitted and/or provided with greater prominence (e.g., via size and positioning) to enhance legibility and/or clarity, and identical reference numbers may be used in the drawings to identify the same or similar elements or acts.

FIG. 3 is a block diagram illustrating an embodiment of one or more server computing systems 300 executing an implementation of an ADIPSDR system 140, such as in a manner similar to that of FIGS. 1A-1C and with additional hardware details illustrated—the server computing system(s) and ADIPSDR system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing ADIPSDR system 140 may communicate with other computing systems and devices via one or more networks 100 (e.g., the Internet, one or more cellular telephone networks, etc.), such as user client computing devices 360 (e.g., used to supply queries; receive responsive answers; and use the received answer information, such as to display or otherwise present answer information to users of the client computing devices and/or to implement further automated activities, such as to access other functionality provided by the ADIPSDR system), optionally other external devices 380 (e.g., used to store and provide dwelling information of one or more types), and optionally other computing systems 390.

In the illustrated embodiment, an embodiment of the ADIPSDR system 140 executes in memory 330 in order to perform at least some of the described techniques, such as by using the processor(s) 305 to execute software instructions of the system 140 in a manner that configures the processor(s) 305 and computing system 300 to perform automated operations that implement those described techniques. The illustrated embodiment of the ADIPSDR system may include one or more components, not shown, to each perform portions of the functionality of the ADIPSDR system, and the memory may further optionally execute one or more other programs 335. The ADIPSDR system 140 may further, during its operation, store and/or retrieve various types of data on storage 320 (e.g., in one or more databases or other data structures), such as various types of user data 328, dwelling data 321 (e.g., dwelling attributes associating each dwelling with any POI locations having an associated predefined POI-specific nearby geographical region in which the POI location is located, with any POI categories having at least one such POI location, etc.), POI data 327a, POI category data 327c, predefined POI-specific nearby geographical search region data 327b, distance-related data 327d, data 327e for non-distance-based ranking criteria, and/or various other types of optional additional information 329.

Some or all of the user client computing devices 360 (e.g., mobile devices), external devices 380, and other computing systems 390 may similarly include some or all of the same types of components illustrated for server computing system 300. As one non-limiting example, the computing devices 360 are each shown to include one or more hardware CPU(s) 361, I/O components 362, and memory and/or storage 369, with a browser and/or ADIPSDR client program 368 optionally executing in memory to interact with the ADIPSDR system 140 and present or otherwise use query responses 367 that are received from the ADIPSDR system for submitted user queries 366. While particular components are not illustrated for the other devices/systems 380 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ADIPSDR system 140 may in some embodiments be distributed in various components, some of the described functionality of the ADIPSDR system 140 may not be provided, and/or other additional functionality may be provided.

It will also be appreciated that, while various items are illustrated as being stored in memory or on storage while being used, these items or portions of them may be transferred between memory and other storage devices, such as for purposes of execution, memory management, data integrity, etc. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ADIPSDR system 140 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
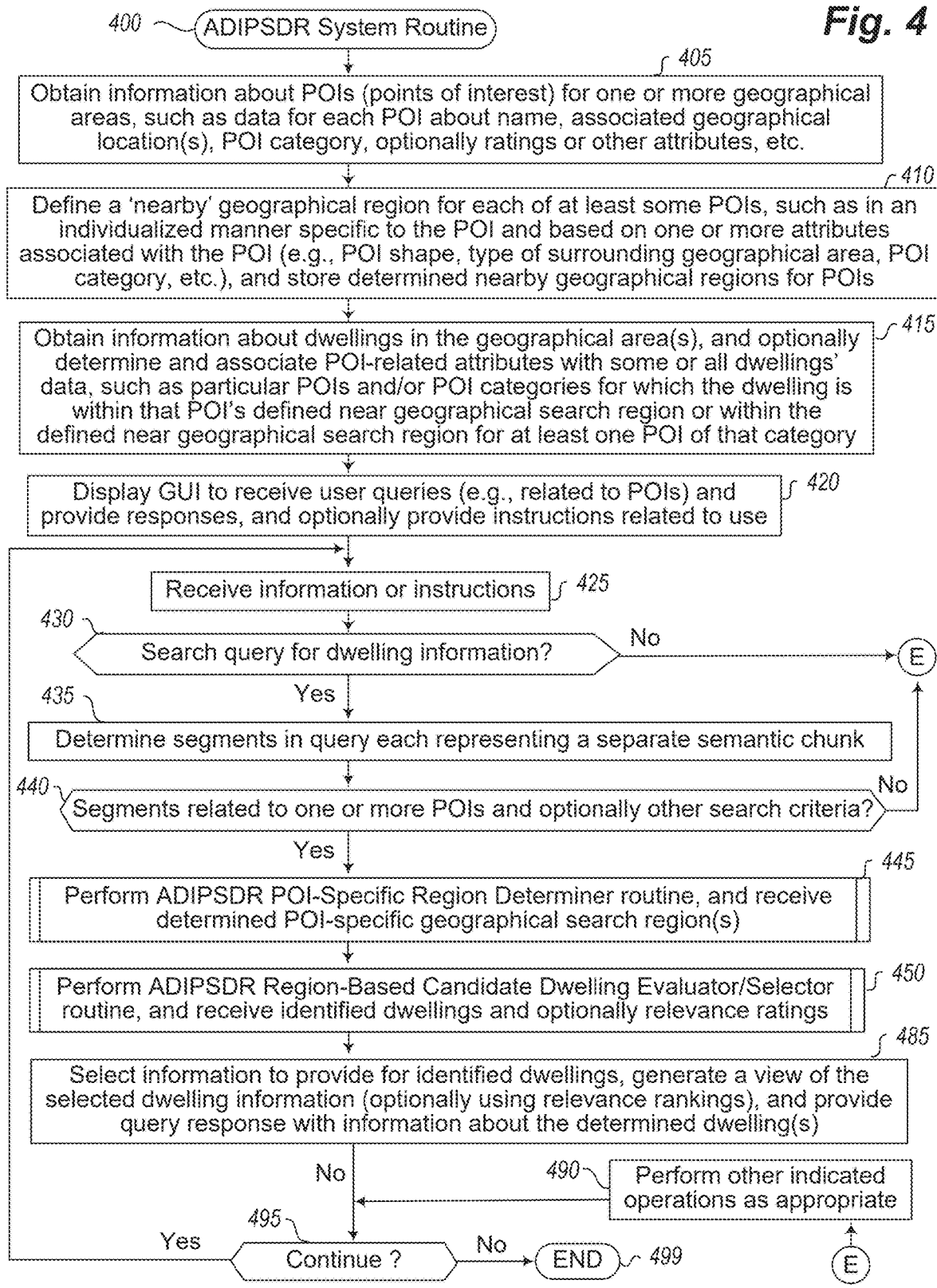
FIG. 4 illustrates a flow diagram of an example embodiment of an Automated Dwelling Information for POI-Specific: Determined Regions ("ADIPSDR") system routine.

FIG. 4 is a flow diagram of an example embodiment of an ADIPSDR system routine 400. The routine may be provided by, for example, execution of the ADIPSDR system 140 of FIGS. 1A-1C, and/or the ADIPSDR system 140 of FIG. 3, and/or corresponding functionality discussed with respect to FIGS. 2A-2D and elsewhere herein, such as to perform automated operations related to automatically responding to a free-form natural language request for information about dwellings within an indeterminate distance from one or more indicated point-of-interest locations by determining and using individualized geographical search regions specific to each point-of-interest location. In the illustrated embodiment, the routine interacts with a single user at a time to provide dwelling response information to search queries from that user, but it will be appreciated that the routine may interact in a similar manner with multiple users (e.g., sequentially or concurrently), and that the routine may in other embodiments perform similar types of activities for other types of information.

In the illustrated embodiment, the routine 400 begins at 405, where it obtains information about a plurality of POI locations for one or more geographical areas, such as data for each POI location about its name, one or more associated geographical locations, its POI category, optionally ratings or other associated attributes, etc. In block 410, the routine then defines a POI-specific nearby geographical region for each of at least some of the POI locations, such as in an individualized manner specific to that POI location and based on one or more attributes associated with the POI location (e.g., shape, a type of surrounding geographical area, POI category, etc.), and stores the determined POI-specific nearby geographical regions for the POI locations for later use. In block 415, the routine then obtains information about dwellings in the one or more geographical areas, and optionally determines and associates one or more POI-related attributes with some or all such dwellings, such as to indicate for a particular dwelling any POI locations in which that dwelling is within its respective POI-specific nearby geographical region and/or any POI categories having at least one such POI location. In block 420, the routine then proceeds to display a GUI to receive user search queries related to POI locations and to provide corresponding responses, as well as to optionally provide instructions related to use of the search functionality.

Figure 5:
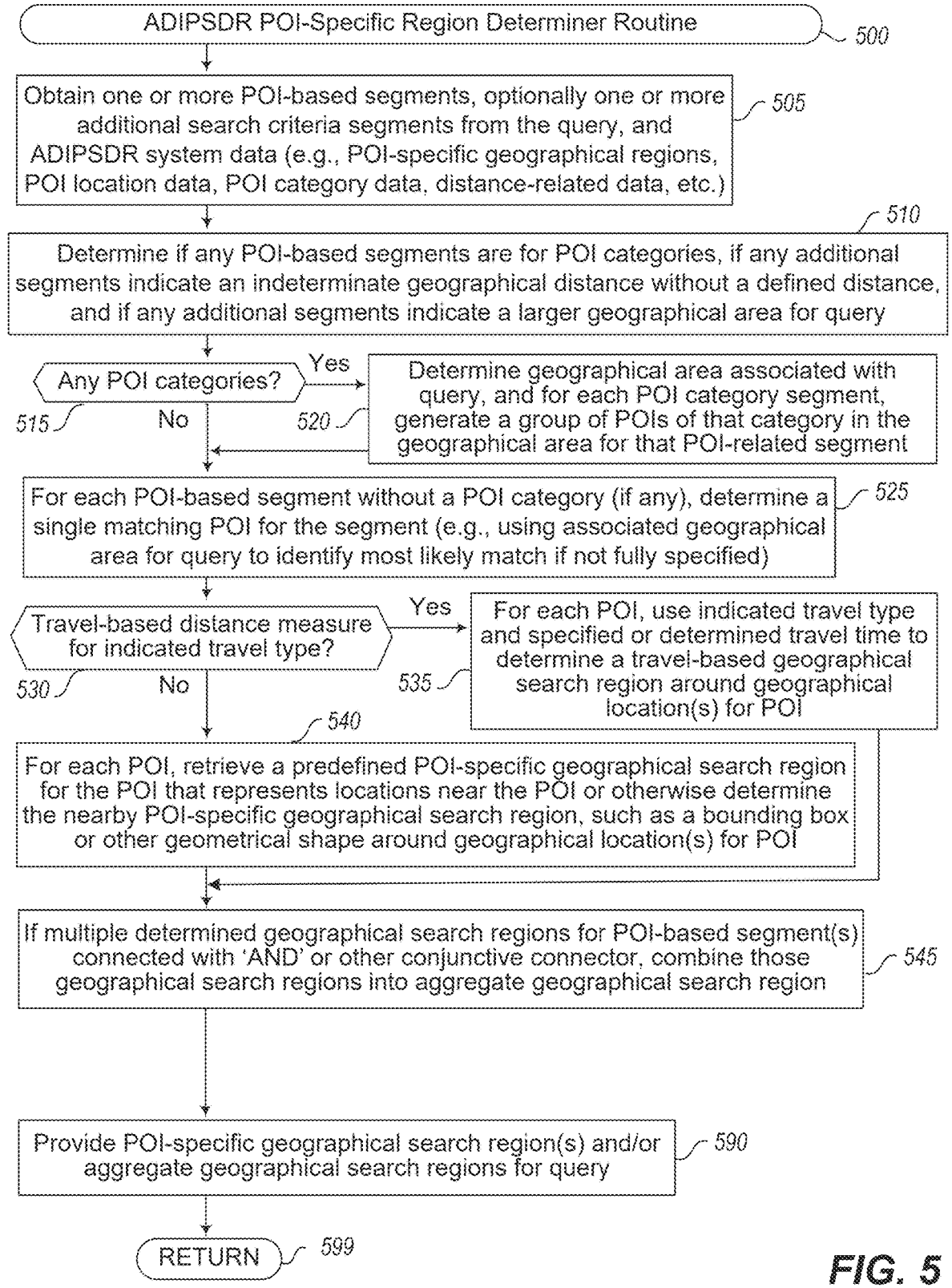
FIG. 5 illustrates a flow diagram of an example embodiment of an ADIPSDR POI-Specific Region Determiner component routine.

The routine then proceeds to perform blocks 425-490 to receive and respond to user-provided search queries and optionally other types of instructions and information. In particular, the routine in block 425 waits to receive instructions or other information, and after receiving such instructions or other information, proceeds to block 430 to determine whether the instructions or other information received in block 425 include a search query for dwelling information. If not, the routine continues to block 490, and otherwise continues to block 435 to determine one or more segments in the search query that each represents a separate semantic chunk and correspond to associated search criteria. In block 440, the routine then determines if there is at least one segment related to at least one POI location, and if not continues to block 490. Otherwise the routine continues to block 445 to perform the ADIPSDR system POI-Specific Region Determiner routine to obtain output indicating one or more determined POI-specific geographical search regions, with FIG. 5 illustrating one example of such a routine. After block 445, the routine continues to block 450 to perform the ADIPSDR system Region-Based Candidate Dwelling Evaluator/Selector routine to obtain output indicating one or more identified dwellings and optionally associated relevance ratings for the one or more determined POI-specific geographical search regions, with one example of such a routine being shown in FIG. 6. After block 450, the routine continues to block 485, where it selects information to provide for each of the identified dwellings, generates a view of the selected dwelling information (optionally using relevance rankings, and in at least some embodiments and situations to display an associated map with information overlaid about the identified dwellings), and provides a query response with information about the determined dwellings. After block 485, the routine continues to block 495.

If it is instead determined in blocks 430 or 440 that the received instructions or other information is not a search query for dwelling information that includes at least one POI-based segment, the routine in block 490 proceeds to perform one or more other indicated operations as appropriate, with non-exclusive examples of such other operations including retrieving and providing previously determined or generated information (e.g., previous user queries, previously determined responses to user queries, etc.), receiving and storing information for later use (e.g., information about dwelling data 321, user data 328, ADIPSDR system data 327, etc.), responding to other types of search queries (e.g., with geographical search regions and/or distances from one or more POI locations that are fully specified), receiving and using feedback from a user in response to provided query responses in block 485, providing information about how one or more previous query responses were determined, performing housekeeping operations, etc.

After blocks 485 or 490, the routine continues to block 495 to determine whether to continue, such as until an explicit indication to terminate is received (or alternatively only if an explicit indication to continue is received). If it is determined to continue, the routine returns to block 425 to await further information or instructions from the same user (or alternatively to return to block 420 to begin interactions with a different user), and if not continues to block 499 and ends.

FIG. 5 is a flow diagram of an example embodiment of an ADIPSDR POI-Specific Region Determiner routine 500. The routine may be provided by, for example, execution of the ADIPSDR POI-Specific Region Determiner component 144 of FIGS. 1A-1C and/or a corresponding component (not shown) of the ADIPSDR system 140 of FIG. 3 and/or with respect to corresponding functionality discussed with respect to FIGS. 2A-2D and elsewhere herein, such as to determine one or more geographical search regions corresponding to a search query (e.g., by using the predefined POI-specific nearby geographical region for each indicated POI location in the search query, or for each POI location of an POI category within a geographical search area indicated in the search query) and optionally determine one or more aggregate geographical search regions generated by combining two or more such predefined POI-specific nearby geographical region according to one or more conjunctive and/or disjunctive search terms specified in the search query. In addition, in at least some situations, the routine 500 may be performed based on execution of block 445 of FIG. 4, with resulting information provided and execution control returning to that location when the routine 500 ends—in other embodiments, the routine may be invoked in other manners. In this example, the routine 500 is performed using particular ways to determine nearby geographical search regions associated with POI locations, but in other embodiments may use other techniques to determine such POI-specific nearby geographical regions, whether in addition to or instead of the illustrated types of techniques.

The illustrated embodiment of the routine 500 begins at block 505, where it obtains one or more POI-based segments for a search query and optionally one or more additional search criteria segments, along with ADIPSDR system data. In block 510, the routine then determines if any of the POI-based segments are for POI categories, if any of the optional additional segments indicate an indeterminate distance without a defined geographical distance, and if any of the optional additional segments indicate a larger geographical area in which the query applies. In block 515, the routine then determines if the search query includes any POI categories, and if so continues to block 520 to determine a geographical area associated with the query, and for each POI category segment, to generate a group of POI locations of that category in the geographical area for that segment. After block 520, or if it is instead determined in block 515 that there are not any indicated POI categories, the routine continues to block 525 to, for each POI-based segment without a POI category (if any), determine a single matching POI location for the segment, such as by using the associated geographical area for the query to identify the most likely match if the POI location is not fully specified by the provided information. In block 530, the routine then determines if the search query includes a travel-based distance measure for an indicated travel type, and if so continues to block 535 to, for each POI location, use the travel-based distance measure for the indicated travel type and a specified or otherwise determined travel time to determine a travel-based geographical search region around the one or more geographical locations for the POI location—in some embodiments, some or all POI locations may each have multiple predefined POI-specific nearby geographical regions corresponding to different travel types and/or travel times, as discussed in greater detail elsewhere herein. If it is instead determined in block 530 that there is not any travel-based distance measure, the routine continues instead to block 540, where, for each POI location, a predefined POI-specific nearby geographical region is retrieved for the POI location that represent locations near the POI location for use as the geographical search region for that POI location, or the geographical search region for that POI location is otherwise determined (e.g., if there is not a predefined POI-specific nearby geographical region to use), such as using a bounding box or other geometrical shape around one or more geographical locations for the POI location. After blocks 535 or 540, the routine continues to block 545, where, if the search query includes multiple criteria with associated geographical search regions that are connected with a conjunctive or disjunctive term, optionally combine those geographical search regions into an aggregate geographical search region according to the indicated term. The determined geographical search region(s) from blocks 535 or 540 or the aggregate geographical search region from block 545 (if any) is then provided as output in block 590, and the routine then continues to block 599 and returns, such as to return to the flow of FIG. 4 at block 445 if invoked from there.

Figure 6:
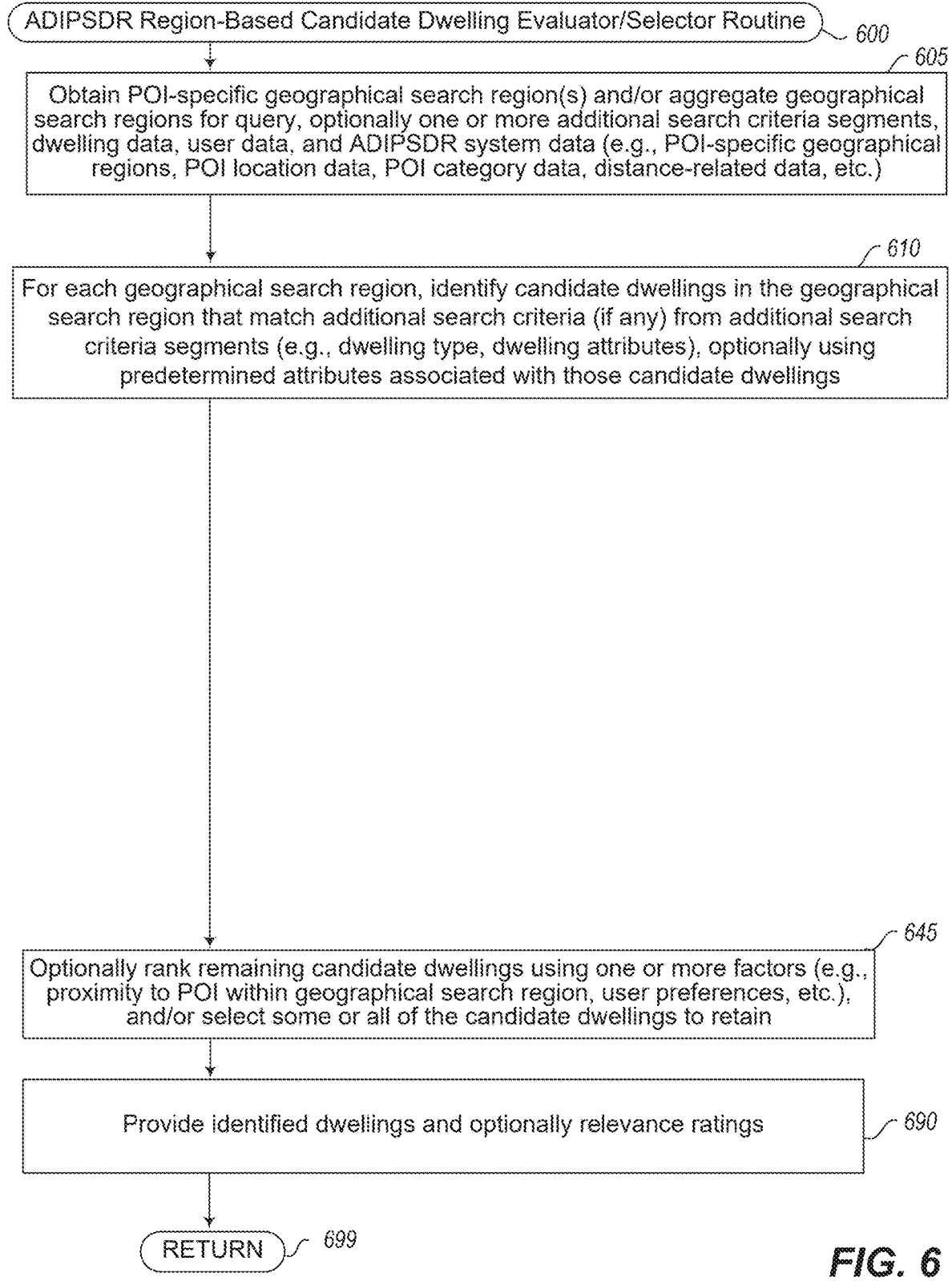
FIG. 6 illustrates a flow diagram of an example embodiment of an ADIPSDR Region-Based Zzz Dwelling Evaluator/Selector component routine.

FIG. 6 is a flow diagram of an example embodiment of an ADIPSDR Region-Based Candidate Dwelling Evaluator/Selector routine 600. The routine may be provided by, for example, execution of the ADIPSDR Region-Based Candidate Dwelling Evaluator/Selector component 146 of FIGS. 1A-1C and/or a corresponding component (not shown) of the ADIPSDR system 140 of FIG. 3 and/or with respect to corresponding functionality discussed with respect to FIGS. 2A-2D and elsewhere herein, such as to receive one or more determined geographical search region(s) for a search query, and to identify one or more dwellings in the search region(s) that satisfy the search criteria of the search query. In addition, in at least some situations, the routine 600 may be performed based on execution of block 450 of FIG. 4, with resulting information provided and execution control returning to that location when the routine 600 ends—in other embodiments, the routine may be invoked in other manners. In this example, the routine 600 is performed using particular ways to identify candidate dwellings in geographical search regions associated with POI locations, but in other embodiments may use other techniques to identify candidate dwellings, whether in addition to or instead of the illustrated types of techniques.

The illustrated embodiment of the routine 600 begins at block 605, where it obtains one or more POI-specific geographical search regions and/or an aggregate geographical search region for a search query, and optionally one or more additional search criteria segments, as well as information about dwellings, user data, and other ADIPSDR system data. In block 610, the routine then, for each geographical search region, identifies any candidate dwellings in the geographical search region that match the additional search criteria (if any) from the additional search criteria segments (e.g., based on dwelling type, other dwelling attributes, etc.)—if the candidate dwellings include associated attributes corresponding to POI locations and/or POI categories, such attributes may be used to determine that the candidate dwellings are within a geographical search region corresponding to an associated POI location and/or a POI category. In block 645, the routine then optionally ranks the candidate dwellings using one or more factors, such as proximity to a POI location within the geographical search region, user preferences, etc., and in some cases may select a specified quantity of candidate dwellings to retain. The remaining candidate dwellings and optionally associated relevance rankings are then provided as output in block 690, and the routine then continues to block 699 and returns, such as to return to the flow of FIG. 4 at block 450 if invoked from there.

Figure 7:
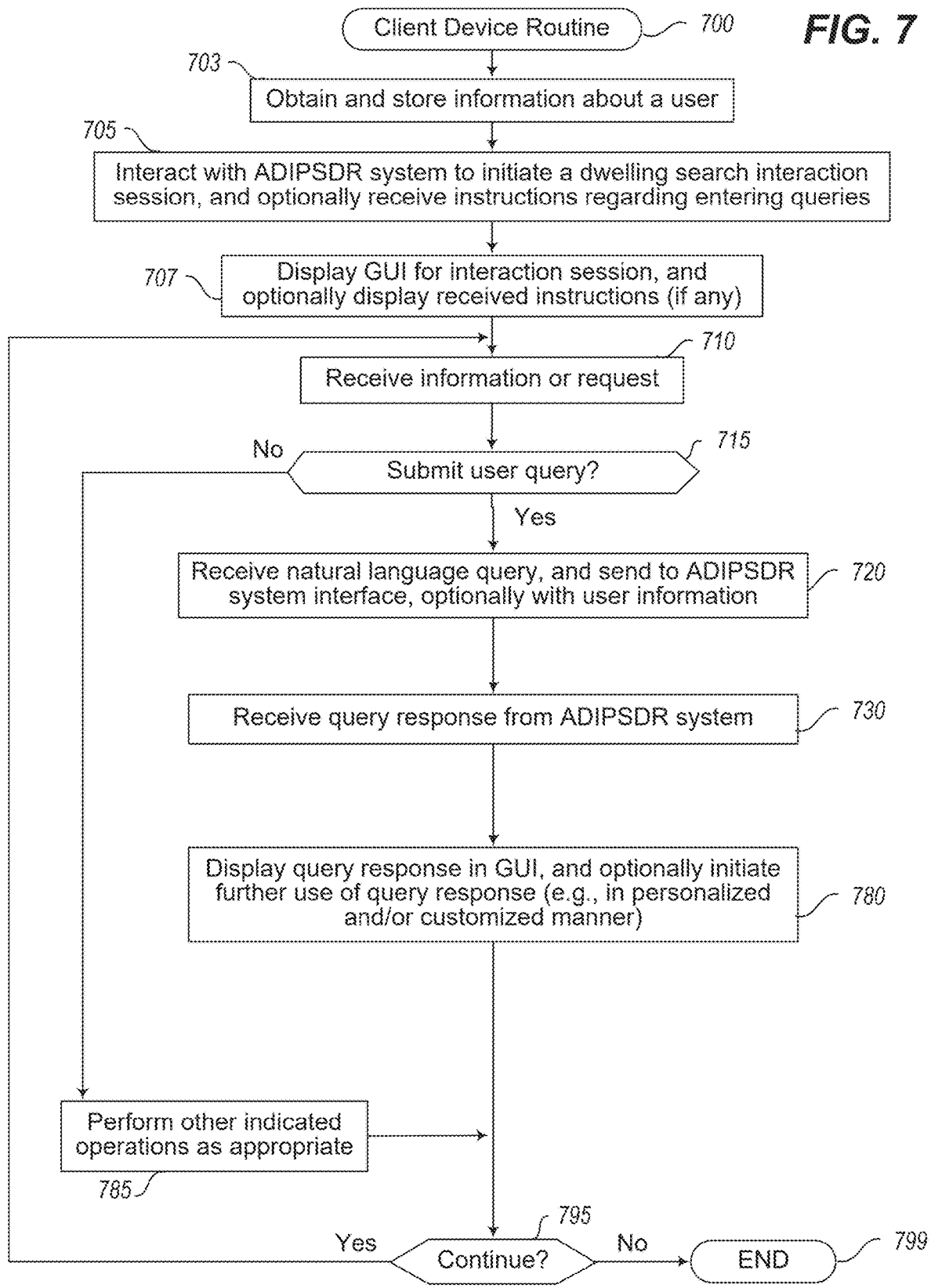
FIG. 7 illustrates a flow diagram of an example embodiment of a client device routine.

FIG. 7 is a flow diagram of an example embodiment of a client device routine 700. The routine may be provided by, for example, operations of a client computing device 360 of FIGS. 1A-1C and/or a client computing device 360 of FIG. 3 and/or with respect to corresponding functionality discussed with respect to FIGS. 2A-2D and elsewhere herein, such as to interact with users or other entities who submit queries (or other information) to the ADIPSDR system, to receive responsive answers (or other information) from the ADIPSDR system, and to optionally use the received information in one or more manners (e.g., to automatically initiate follow-up activities in accordance with a received responsive answer).

The illustrated embodiment of the routine 700 begins at block 703, where information is optionally obtained and stored about the user, such as for later use in personalizing or otherwise customizing further actions to that user. The routine then continues to block 705 to interact with the ADIPSDR system to initiate an interaction session (e.g., in response to a corresponding instruction from the user), as well as to optionally receive a greeting and/or introductory instructions regarding using a GUI of the ADIPSDR system. In block 707, the routine then displays a GUI for the interaction session, and optionally displays the received greeting and/or introductory instructions, if any. The routine then continues to perform blocks 710-780 as part of participating in the interaction session.

In particular, the routine continues to block 710 after block 707, where it waits until information or a request is received from the user. In block 715, the routine determines if the information or request received in block 710 is a search query to submit, such as in a natural language format (e.g., freeform text), and if not continues to block 785. Otherwise, the routine continues to block 720, where it sends the received query to the ADIPSDR system interface, optionally along with additional information about the user from block 703, to obtain a corresponding responsive answer—in other embodiments, the routine may further modify the received user query to personalize and/or customize the information to be provided to the ADIPSDR system (e.g., to add information specific to the user, such as location, demographic information, preference information, etc.). In block 730, the routine then receives a responsive answer to the query from the ADIPSDR system. In block 780, the routine then displays the received query response in the GUI, and optionally initiates further use of the query response in one or more manners (e.g., in a manner that is personalized and/or customized for the user)—in some embodiments, the further initiated activities may include invoking of other functionality of the ADIPSDR system, such as to initiate an inspection process for a selected dwelling indicated in dwelling information search results, to initiate a mortgage application process for a selected dwelling indicated in dwelling information search results, to initiate matching the user with a real estate professional as part of a housing search based on corresponding response information received from the ADIPSDR system, etc.

In block 785, the routine instead performs one or more indicated operations as appropriate other than receiving and submitting a query, with non-exclusive examples including sending information to the ADIPSDR system of other types, receiving and storing user data for later use in personalization and/or customization activities, receiving and responding to requests for information about previous user queries and/or corresponding responsive answers for a current user and/or client device, receiving and responding to indications of one or more housekeeping activities to perform, etc. After blocks 780 or 785, the routine continues to block 795 to determine whether to continue, such as until an explicit indication to terminate is received (or alternatively only if an explicit indication to continue is received). If it is determined to continue, the routine returns to block 710, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:
    determining, by one or more computing devices, respective geographical regions around multiple point-of-interest locations in one or more geographical areas, wherein each of the multiple point-of-interest locations is part of one of multiple point-of-interest categories that include parks or schools or hospitals or lakes or beaches, wherein the determining of each respective geographical region around a point-of-interest location includes:
        determining, by the one or more computing devices, a distance to use for the respective geographical region around that point-of-interest location in an individualized manner specific to that point-of-interest location, the determining of the distance being based on at least one of a type of geographical area in which that point-of-interest location is located, or the category of which that point-of-interest location is a part, or a shape of that point-of-interest location; and
        generating, by the one or more computing devices, the respective geographical region around that point-of-interest location to include additional locations within the determined distance for that point-of-interest location;
    determining, by the one or more computing devices and for each of the multiple point-of-interest locations, a plurality of dwellings located in the determined respective geographical region for that point-of-interest location;
    storing, by the one or more computing devices and for each of the multiple point-of-interest locations, multiple attributes in a database for each of the determined plurality of dwellings for that point-of-interest location, the multiple attributes for each dwelling including an association of that dwelling with that point-of-interest location and including additional attributes specific to that dwelling;

receiving, by the one or more computing devices and after the storing of the multiple attributes in the database for each of the determined plurality of dwellings for each of the multiple point-of-interest locations, a user query for information about dwellings that satisfy multiple specified search criteria, the multiple search criteria being specified using a sequence of freeform terms submitted via a natural language interface; and providing, by the one or more computing devices and using stored attributes in the database, search results in response to the user query, the providing of the search results including:

separating, by the one or more computing devices, the sequence of the freeform terms into multiple segments each having one or more terms, the multiple segments including one or more first segments identifying one of the multiple point-of-interest locations, and a second segment indicating a type of dwelling, a third segment that connects the one or more first segments and the second segment and that indicates the type of dwelling is nearby the one point-of-interest location, and one or more fourth segments indicating one or more dwelling attributes;

determining, by the one or more computing devices and based at least in part on a search of the database for dwellings having stored attributes indicating an association with the one point-of-interest location, multiple dwellings that are of the indicated type of dwelling and that each has stored attributes indicating an association with the one point-of-interest location and matching the one or more dwelling attributes; and presenting, by the one or more computing devices and in a displayed graphical user interface, information about the determined multiple dwellings as part of the search results in response to the user query.

2. The computer-implemented method of claim 1 wherein the stored multiple attributes in the database for each of the determined plurality of dwellings for each of the multiple point-of-interest locations further includes an association of that dwelling with the category for that point-of-interest location, and wherein the determining of the multiple dwellings further includes identifying a plurality of dwellings that have associations in the stored multiple attributes for that dwelling with the category of the one point-of-interest location, and selecting the determined multiple dwellings from the identified plurality of dwellings.

3. The computer-implemented method of claim 2 wherein the sequence of freeform terms indicates one of the multiple categories, wherein the identifying of the one point-of-interest location in the one or more first segments includes identifying the one category in the one or more first segments and selecting point-of-interest locations that are of the one category, the selected point-of-interest locations including the one point-of-interest location, and wherein the method further comprises:

determining, by the one or more computing devices and for each of the selected point-of-interest locations other than the one point-of-interest location, one or more additional dwellings that are located in a determined respective geographical region for that point-of-interest location and with which the one category is associated; and presenting, by the one or more computing devices in the displayed graphical user interface and for each of the selected point-of-interest locations other than the one point-of-interest location, information about the determined one or more additional dwellings for that point-of-interest location as a further part of response information to the user query.

4. A computer-implemented method comprising:

determining, by one or more computing devices, respective geographical regions around multiple point-of-interest locations in one or more geographical areas, wherein the determining of each respective geographical region around a point-of-interest location involves selecting that respective geographical region to include additional locations within a distance from that point-of-interest location that is determined using one or more attributes of that point-of-interest location;

determining, by the one or more computing devices and for each of the multiple point-of-interest locations, a plurality of dwellings located in the determined respective geographical region for that point-of-interest location;

storing, by the one or more computing devices and for each of the multiple point-of-interest locations, multiple attributes in a database for each of the determined plurality of dwellings for that point-of-interest location, the multiple attributes for each dwelling including an association of that dwelling with that point-of-interest location and including additional attributes specific to that dwelling;

receiving, by the one or more computing devices and after the storing of the multiple attributes in the database for each of the determined plurality of dwellings for each of the multiple point-of-interest locations, a user query for information about dwellings that satisfy multiple specified search criteria, the multiple search criteria being specified using a sequence of freeform terms submitted via a natural language interface;

separating, by the one or more computing devices, the sequence of the freeform terms into multiple segments each having one or more terms, the multiple segments including one or more first segments identifying one of the multiple point-of-interest locations, and a second segment indicating a type of dwelling, and one or more third segments indicating an indeterminate distance around the one point-of-interest location;

determining, by the one or more computing devices and based at least in part on stored attributes in the database for dwellings indicating associations of dwellings with the one point-of-interest location, one or more dwellings of the indicated type of dwelling that each has stored attributes indicating an association with the one point-of-interest location and satisfying the multiple specified search criteria; and presenting, by the one or more computing devices, information about the determined one or more dwellings as part of search results in response information to the user query.

5. The computer-implemented method of claim 4 wherein the determining of the one or more dwellings includes identifying a plurality of dwellings in the selected geographical search region that have associations with the one point-of-interest location in the stored multiple attributes for that dwelling, and selecting the determined one or more dwellings from the identified plurality of dwellings based at least in part on satisfying the multiple specified search criteria.

6. The computer-implemented method of claim 5 wherein the sequence of freeform terms indicate one of multiple categories of point-of-interest locations,
   wherein the associating of the one or more attributes with each of the plurality of dwellings located in the determined respective geographical region for a point-of-interest location includes associating one of the multiple categories for that point-of-interest location with that dwelling,
   wherein the identifying of the one point-of-interest location in the one or more first segments includes identifying the one category in the one or more first segments and selecting a plurality of the multiple point-of-interest locations that are of the one category and that include the one point-of-interest location,
   and wherein the method further comprises:
      determining, by the one or more computing devices and for each of the plurality of point-of-interest locations other than the one point-of-interest location, one or more additional dwellings located in a determined respective geographical region for that point-of-interest location with which the one category is associated; and
      providing, by the one or more computing devices and for each of the plurality of point-of-interest locations other than the one point-of-interest location, information about the determined one or more additional dwellings for that point-of-interest location as a further part of the response information to the user query.

7. The computer-implemented method of claim 4 wherein the one point-of-interest location is of one of multiple categories of point-of-interest locations that include schools, parks, hospitals and lakes, wherein the one or more geographical areas each includes at least one governmentally defined area, and wherein the determining of the geographical search region for the one point-of-interest location includes selecting the distance based on at least one of a type of geographical area in which the one point-of-interest location is located, or a category of the one point-of-interest location, or a shape of the one point-of-interest location.

8. The computer-implemented method of claim 4 wherein the sequence of freeform terms indicates one of multiple categories of point-of-interest locations, and wherein the method further comprises:
   identifying, by the one or more computing devices, the indicated one category in the sequence of freeform terms, and determining a plurality of point-of-interest locations that are of the indicated one category and that include the one point-of-interest location;
   determining, by the one or more computing devices and for each of the plurality of point-of-interest locations other than the one point-of-interest location, one or more additional dwellings located in a determined respective geographical region for that point-of-interest location that satisfy the search criteria; and
   presenting, by the one or more computing devices and for each of the plurality of point-of-interest locations other than the one point-of-interest location, information about the determined one or more additional dwellings for that point-of-interest location as a further part of the response information to the user query.

9. The computer-implemented method of claim 4 wherein the method further comprises:

identifying, by the one or more computing devices, a term in the sequence of freeform terms that connects two search criteria of the multiple search criteria, the identified term being a conjunctive term or a disjunctive term, and a first of the two search criteria corresponding to the one or more terms of the one or more first segments associated with the one point-of-interest location; and
determining, by the one or more computing devices, an aggregate geographical search region based on combining the determined respective geographical region for the one point-of-interest location and additional geographical constraints corresponding to a second of the two search criteria, wherein the aggregate geographical search region is, if the identified term is a conjunctive term, a subset of the determined respective geographical region for the one point-of-interest location that corresponds to the additional geographical constraints, or is, if the identified term is a disjunctive term, a combination of the determined respective geographical region for the one point-of-interest location and an additional geographical region corresponding to the additional geographical constraints,
and wherein the determining of the one or more dwellings further includes determining, by the one or more computing devices, multiple dwellings in the determined aggregate geographical search region that satisfy the multiple search criteria, and wherein the presenting of the information about the determined one or more dwellings includes presenting information about the determined multiple dwellings.

10. The computer-implemented method of claim 4 wherein the user query is received from a client device, and wherein the presenting of the information about the determined one or more dwellings includes transmitting, by the one or more computing devices, the search results that include the information about the determined one or more dwellings over one or more computer networks to the client device for display on the client device.

11. A system comprising:
   one or more hardware processors of one or more computing devices; and
   one or more memories with stored instructions that, when executed by at least one of the one or more hardware processors, cause at least one computing device of the one or more computing devices to perform automated operations including at least:
      determining respective geographical regions for multiple point-of-interest locations in one or more geographical areas, wherein the determining of each respective geographical region for a point-of-interest location involves selecting that respective geographical region to include additional locations within a distance from that point-of-interest location that is determined using one or more attributes of that point-of-interest location;
      determining, for each of the multiple point-of-interest locations, a plurality of dwellings located in the determined respective geographical region for that point-of-interest location;
      storing, for each of the multiple point-of-interest locations, multiple attributes in a database for each of the determined plurality of dwellings for that point-of-interest location, the multiple attributes for each dwelling including an association of that dwelling with that point-of-interest location and including additional attributes specific to that dwelling;

receiving, after the storing of the multiple attributes in the database for each of the determined plurality of dwellings for each of the multiple point-of-interest locations, a user query for information about dwellings satisfying one or more search criteria specified using one or more freeform natural language terms;

identifying at least one of the freeform terms associated with one of the multiple point-of-interest locations;

determining, based at least in part on stored attributes in the database for dwellings indicating associations of dwellings with the one point-of-interest location, one or more dwellings located in the determined respective geographical region for the one point-of-interest location that satisfy the one or more search criteria; and providing information about the determined one or more dwellings as part of response information to the user query.

12. The system of claim 11 wherein the user query specifies multiple search criteria using a sequence of multiple freeform terms, wherein the stored instructions include software instructions that, when executed by the one or more hardware processors, cause the one or more computing devices to perform further automated operations including separating the sequence of the multiple freeform terms into multiple segments each having one or more terms, the multiple segments including one or more first segments indicating the one point-of-interest location, and further including a second segment indicating a type of dwelling, and further including one or more third segments indicating an indeterminate distance around the one point-of-interest location, wherein the determining of the one or more dwellings further includes determining that the one or more dwellings are of the indicated type of dwelling, and wherein the providing of the information about the determined one or more dwellings includes presenting the information about the determined one or more dwellings in a displayed graphical user interface.

13. The system of claim 12 wherein the indicated type of dwelling is one of a house or a home or an apartment or a condominium, and wherein the indeterminate distance around the one point-of-interest location includes an indication of nearness without further description or an indication of a type of travel for an amount of time.

14. The system of claim 11 wherein the multiple point-of-interest locations are located in multiple geographical areas and are of multiple categories of point-of-interest locations, wherein the determined respective geographical regions for the multiple point-of-interest locations have multiple sizes, and wherein the determining of the respective geographical region for the one point-of-interest location includes selecting one of the multiple sizes to use based on at least one of a type of geographical area in which the one point-of-interest location is located, or a category of the one point-of-interest location, or a shape of the one point-of-interest location.

15. The system of claim 14 wherein the multiple categories of point-of-interest locations include schools, parks, hospitals and lakes, and wherein the multiple geographical areas each include at least one governmentally defined area.

16. The system of claim 11 wherein the one or more freeform natural language terms indicate one of multiple categories of point-of-interest locations, wherein the identifying of the at least one freeform term includes identifying the indicated one category and determining a plurality of the multiple point-of-interest locations that are of the indicated one category and that include the one point-of-interest location, and wherein the automated operations further include:

determining, for each of the plurality of point-of-interest locations other than the one point-of-interest location, one or more additional dwellings located in the determined respective geographical region for that point-of-interest location that satisfy the one or more search criteria; and providing, for each of the plurality of point-of-interest locations other than the one point-of-interest location, information about the determined one or more additional dwellings for that point-of-interest location as a further part of the response information to the user query.

17. The system of claim 11 wherein the one or more freeform natural language terms include multiple terms indicating multiple search criteria, wherein the automated operations further include:

identifying a term in the multiple terms connecting two search criteria of the multiple search criteria, the identified term being a conjunctive term or a disjunctive term, and a first of the two search criteria including the at least one freeform term associated with the one point-of-interest location; and determining an aggregate geographical search region based on combining the determined respective geographical region for the one point-of-interest location and additional geographical constraints corresponding to a second of the two search criteria, wherein the aggregate geographical search region is, if the identified term is a conjunctive term, a subset of the determined respective geographical region for the one point-of-interest location that corresponds to the additional geographical constraints, or is, if the identified term is a disjunctive term, a combination of the determined respective geographical region for the one point-of-interest location and an additional geographical region corresponding to the additional geographical constraints, wherein the determining of the one or more dwellings further includes determining multiple dwellings in the determined aggregate geographical search region that satisfy the multiple search criteria, and wherein the providing of the information about the determined one or more dwellings includes providing information about the determined multiple dwellings.

18. The system of claim 11 wherein the one or more freeform natural language terms include multiple terms and further indicate one or more dwelling attributes, and wherein the determining of the one or more dwellings further includes determining that the one or more dwellings have the one or more dwelling attributes.

19. A non-transitory computer-readable medium having stored contents that cause one or more computing devices to perform automated operations, the automated operations including at least:

determining, by the one or more computing devices and for each of multiple point-of-interest locations in a geographical area, a plurality of dwellings associated with a respective geographical region for that point-of-interest location within the geographical area, wherein the respective geographical region for each of the multiple point-of-interest locations is determined using a distance from that point-of-interest location that is based on one or more attributes of that point-of-interest location;

storing, by the one or more computing devices and for each of the multiple point-of-interest locations, multiple attributes in a database for each of the determined plurality of dwellings for that point-of-interest location, the multiple attributes for each dwelling including an association of that dwelling with that point-of-interest location and including additional attributes specific to that dwelling;

receiving, by the one or more computing devices and after the storing of the multiple attributes in the database for each of the determined plurality of dwellings for each of the multiple point-of-interest locations, a user query for information about dwellings that satisfy multiple specified search criteria, the multiple specified search criteria including a sequence of freeform natural language terms;

separating, by the one or more computing devices, the sequence of the freeform natural language terms into multiple segments each having one or more terms, the multiple segments including one or more first segments identifying one of the multiple point-of-interest locations in the geographical area, and including one or more second segments indicating one or more dwelling attributes;

determining, by the one or more computing devices and based at least in part on stored attributes in the database indicating associations of dwellings with the one point-of-interest location, one or more dwellings of the plurality of dwellings associated with the respective geographical region for the one point-of-interest location that have the one or more dwelling attributes; and providing, by the one or more computing devices, information about the determined one or more dwellings as part of response information to the user query.

20. The non-transitory computer-readable medium of claim 19 wherein the stored contents include software instructions that, when executed by the one or more computing devices, cause the one or more computing devices to perform further automated operations including determining, by the one or more computing devices and before the receiving of the user query, the respective geographical regions around the multiple point-of-interest locations in the geographical area, and wherein the providing of the information about the determined one or more dwellings includes presenting, by the one or more computing devices, the information about the determined one or more dwellings in a displayed graphical user interface.

21. The non-transitory computer-readable medium of claim 19 wherein the separating of the sequence of the freeform terms into the multiple segments further includes identifying a third segment indicating a type of dwelling, and one or more fourth segments indicating an indeterminate distance around the one point-of-interest location, wherein the type of dwelling is one of a house or a home or an apartment or a condominium, wherein the indeterminate distance around the one point-of-interest location includes one of an indication of nearness without further description or an indication of a type of travel and a time, wherein the determined distance for the respective geographical region for the one point-of-interest location represents indeterminate distance, and wherein the determining of the one or more dwellings further includes determining that the one or more dwellings are of the indicated type of dwelling.

22. The non-transitory computer-readable medium of claim 19 wherein the multiple point-of-interest locations are part of a plurality of point-of-interest locations located in multiple geographical areas and are of multiple categories of point-of-interest locations, wherein the multiple categories of point-of-interest locations include schools, parks, hospitals and lakes, wherein the multiple geographical areas each includes at least one governmentally defined area, and wherein the determined distance for the respective geographical region for the one point-of-interest location is based on at least one of a type of geographical area in which the one point-of-interest location is located, or a category of the one point-of-interest location, or a shape of the one point-of-interest location.

23. The non-transitory computer-readable medium of claim 19 wherein the sequence of freeform natural language terms indicate one of multiple categories of point-of-interest locations, and wherein the automated operations further include:

identifying the indicated one category in the sequence of freeform natural language terms, and determining a plurality of point-of-interest locations that are of the indicated one category and that include the one point-of-interest location;

determining, for each of the plurality of point-of-interest locations other than the one point-of-interest location, one or more additional dwellings located in a determined respective geographical region for that point-of-interest location that satisfy the search criteria; and providing, for each of the plurality of point-of-interest locations other than the one point-of-interest location, information about the determined one or more additional dwellings for that point-of-interest location as a further part of the response information to the user query.

24. The non-transitory computer-readable medium of claim 19 wherein the automated operations further include:

identifying a term in the sequence of freeform natural language terms that connects two search criteria of the multiple search criteria, the identified term being a conjunctive term or a disjunctive term, and the two search criteria corresponding to the one or more terms of the one or more first segments associated with the one point-of-interest location; and determining an aggregate geographical search region based on combining the determined respective geographical region for the one point-of-interest location and additional geographical constraints corresponding to the two search criteria, wherein the aggregate geographical search region is, if the identified term is a conjunctive term, a subset of the determined respective geographical region for the one point-of-interest location that corresponds to the additional geographical constraints, or is, if the identified term is a disjunctive term, a combination of the determined respective geographical region for the one point-of-interest location and an additional geographical region corresponding to the additional geographical constraints, and wherein the determining of the one or more dwellings further includes determining multiple dwellings in the determined aggregate geographical search region that satisfy the multiple search criteria, and wherein the providing of the information about the determined one or more dwellings includes providing information about the determined multiple dwellings.

* * * * *